(12) United States Patent
Shimoshikiryoh et al.

(10) Patent No.: US 10,991,326 B2
(45) Date of Patent: Apr. 27, 2021

(54) LIQUID CRYSTAL DISPLAY PANEL AND CORRECTION METHOD THEREFOR

(71) Applicant: Sharp Kabushiki Kaisha, Sakai (JP)

(72) Inventors: Fumikazu Shimoshikiryoh, Sakai (JP); Takehisa Yoshida, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 397 days.

(21) Appl. No.: 15/770,072

(22) PCT Filed: Oct. 20, 2016

(86) PCT No.: PCT/JP2016/081086
§ 371 (c)(1),
(2) Date: Apr. 20, 2018

(87) PCT Pub. No.: WO2017/069193
PCT Pub. Date: Apr. 27, 2017

(65) Prior Publication Data
US 2020/0243028 A1 Jul. 30, 2020

(30) Foreign Application Priority Data

Oct. 22, 2015 (JP) .............................. JP2015-207797

(51) Int. Cl.
*G09G 3/36* (2006.01)
*G02F 1/1362* (2006.01)

(52) U.S. Cl.
CPC ..... *G09G 3/3614* (2013.01); *G02F 1/136286* (2013.01)

(58) Field of Classification Search
CPC .................................................. G09G 3/3614
See application file for complete search history.

(56) References Cited

U.S. PATENT DOCUMENTS

2003/0103045 A1 6/2003 Shiraishi
2005/0122441 A1 6/2005 Shimoshikiryoh
(Continued)

FOREIGN PATENT DOCUMENTS

JP 62-271574 A 11/1987
JP 2003-202846 A 7/2003
(Continued)

OTHER PUBLICATIONS

Official Communication issued in International Patent Application No. PCT/JP2016/081086, dated Jan. 17, 2017.

*Primary Examiner* — Gustavo Polo
(74) *Attorney, Agent, or Firm* — Keating & Bennett, LLP

(57) ABSTRACT

A liquid crystal display panel includes: a plurality of first source drivers (35*a*) provided in a first frame region (20*a*), each first source driver supplying a first display signal voltage to source bus lines, from among a plurality of source bus lines (14*s*), that are associated with the first source driver; and a plurality of second source drivers (35*b*) provided in a second frame region (20*b*), each second source driver supplying a second display signal voltage to source bus lines, from among the plurality of source bus lines, that are associated with the second source driver. In each vertical scanning period, the first display signal voltage and the second display signal voltage are supplied to each of the plurality of source bus lines while being superposed on each other, and polarities of the first display signal voltage and the second display signal voltage do not change within each vertical scanning period.

17 Claims, 17 Drawing Sheets

(56) References Cited

U.S. PATENT DOCUMENTS

| | | |
|---|---|---|
| 2007/0262941 A1 | 11/2007 | Jan et al. |
| 2009/0322715 A1 | 12/2009 | Hirato |
| 2011/0315991 A1 | 12/2011 | Sugihara et al. |
| 2012/0086700 A1 | 4/2012 | Numao |
| 2012/0138922 A1 | 6/2012 | Yamazaki et al. |
| 2013/0320334 A1 | 12/2013 | Yamazaki et al. |
| 2013/0321483 A1 | 12/2013 | You et al. |
| 2014/0286076 A1 | 9/2014 | Aoki et al. |

FOREIGN PATENT DOCUMENTS

| | | |
|---|---|---|
| JP | 2005-189804 A | 7/2005 |
| JP | 2012-134475 A | 7/2012 |
| JP | 2013-250545 A | 12/2013 |
| JP | 2014-007399 A | 1/2014 |
| JP | 2014-209727 A | 11/2014 |
| WO | 2008/111268 A1 | 9/2008 |
| WO | 2010/103726 A1 | 9/2010 |
| WO | 2011/001707 A1 | 1/2011 |

(a)

(b)

(a)

(b)

LIQUID CRYSTAL DISPLAY PANEL AND CORRECTION METHOD THEREFOR

TECHNICAL FIELD

The present invention relates to a liquid crystal display panel and a repair method therefor. Particularly, the present invention relates to a large-size liquid crystal display panel for use in a high-definition television and a method for repairing a break in a source bus line thereof. Herein, a liquid crystal display panel refers to a TFT-type liquid crystal display panel, unless otherwise specified.

BACKGROUND ART

The present applicant manufactures and sells large-size high-definition liquid crystal display panels. For example, with a large-size liquid crystal display panel having a high definition exceeding FHD, such as 4K or 8K, a source driver (a signal line driving circuit) for supplying display signal voltages to source bus lines (signal lines) may be required to have a high charging ability. With a high-definition and/or large-size liquid crystal display panel, a driving method may be employed, in which source drivers are provided in frame regions on opposite sides of the display region (e.g., on the upper side and the lower side of the display region) of the liquid crystal display panel, wherein each source bus line receives display signal voltages input from both source drivers (hereinafter referred to as a "two-side input driving structure".). A liquid crystal display panel having the two-side input driving structure has a high charging ability because it includes two source drivers for driving each source bus line. The charging ability that is required for each source driver can be reduced as compared with a liquid crystal display panel of a driving method, in which source drivers are provided in one of the frame regions on the upper side or the lower side of the display region of the liquid crystal display panel, wherein each source bus line receives a display signal voltage input from one source driver (which may be referred to as a "one-side input driving structure" as opposed to the two-side input driving structure described above.).

Patent Document No. 1 discloses a liquid crystal display device having the two-side input driving structure described above. According to the liquid crystal display device of Patent Document No. 1, it is possible to display without a hitch even if there is a break in a source bus line.

Various ideas have been devised so as to improve the display quality of a liquid crystal display panel. Each pixel of a liquid crystal display panel exhibits a brightness in accordance with the level of the voltage applied across the liquid crystal layer. A pixel is electrically represented as a liquid crystal capacitor having a pixel electrode/liquid crystal layer/counter electrode structure, and the level of the voltage applied to the pixel (liquid crystal layer) is represented with respect to the potential of the counter electrode. A liquid crystal material is a dielectric material, and deteriorates after a DC voltage is applied therethrough over a long time. In order to prevent this, the polarity (direction) of the voltage (electric field) applied across the liquid crystal layer is inverted after every passage of a predetermined amount of time (this is referred to as "AC driving"). A frame inversion driving (or field inversion driving) has been employed, in which the polarity of the voltage (the direction of the electric field) applied to each pixel is inverted every vertical scanning period. Note that the "vertical scanning period" means the period from when a certain scanning line (gate bus line) is selected until that scanning line is selected next.

However, with mass-produced liquid crystal display panels, it is difficult to accurately match the absolute value of the voltage before the inversion of the polarity of the voltage with that after the inversion, and the absolute value of the voltage changes slightly each time its polarity is inverted. As a result, when a still image is displayed, the brightness changes each time the polarity is inverted, causing flicker of the display. In view of this, a method for reducing flicker has been employed, which makes use of the effect of spatially averaging brightnesses of pixels by arranging, adjacent to each other in the display region, pixels to which voltages of opposite polarities are applied. A representative method is a driving method of inverting the polarity between voltages that are applied to pixels adjacent to each other, thereby realizing a state called "dot inversion" (this may also be called a "one-dot inversion driving"). A "dot" means a pixel.

CITATION LIST

Patent Literature

Patent Document No. 1: Japanese Laid-Open Patent Publication No. S62-271574

SUMMARY OF INVENTION

Technical Problem

When the present inventors used one-dot inversion driving in order to improve the display quality for the liquid crystal display device of Patent Document No. 1 having a two-side input driving structure, the problem of the source driver heating up excessively occurred in some cases (Problem 1). As a result of a study by the present inventors, Problem 1 was ascribable to the liquid crystal display panel having a two-side input driving structure, and was due to a cause that does not occur with a liquid crystal display panel having a one-side input driving structure. The details will be described later.

As a result of a study by the present inventors, the liquid crystal display device of Patent Document No. 1 is capable of operating without the need for a repair even if a break occurs in a source bus line, but there was in some cases a problem that a dark area occurs in the display region of the liquid crystal display panel when a break occurs in a source bus line (Problem 2). Problem 2 is particularly pronounced with high-definition and/or large-size liquid crystal display panels, and is because the charging ability of the source driver is insufficient. The details will be described later.

The present invention has an object of solving at least Problem 1 described above, and an object of providing a liquid crystal display panel capable of suppressing the heat generation of source drivers and reducing the charging ability that is required for each source driver, and a repair method therefor.

Solution to Problem

A liquid crystal display panel according to an embodiment of the present invention includes: a plurality of pixels arranged in a matrix pattern having a plurality of rows and a plurality of columns; a plurality of transistors each of which is connected to one of the plurality of pixels; a plurality of gate bus lines each of which extends in a row direction and is connected to one or more of the plurality of transistors; a plurality of source bus lines each of which extends in a column direction and is connected to one or more of the plurality of transistors; a plurality of first source drivers provided in a first frame region on an upper side of a display region that is defined by the plurality of pixels, each first source driver supplying a first display signal voltage to source bus lines, from among the plurality of source bus lines, that are associated with the first source driver; and a plurality of second source drivers provided in a second frame region on a lower side of the display region, each second source driver supplying a second display signal voltage to source bus lines, from among the plurality of source bus lines, that are associated with the second source driver, wherein in each vertical scanning period, the first display signal voltage and the second display signal voltage are supplied to each of the plurality of source bus lines while being superposed on each other, and polarities of the first display signal voltage and the second display signal voltage do not change within each vertical scanning period.

In one embodiment, the plurality of source bus lines include first source bus lines arranged corresponding to pixel columns, and transistors connected to two pixels adjacent to each other in the row direction are connected to different first source bus lines, and wherein polarities of the first display signal voltages supplied to two first source bus lines adjacent to each other are opposite to each other in each vertical scanning period, and polarities of the second display signal voltages supplied to two first source bus lines adjacent to each other are opposite to each other in each vertical scanning period.

In one embodiment, transistors connected to two pixels adjacent to each other in the column direction are connected to different first source bus lines.

In one embodiment, where m is the number of the plurality of rows of the plurality of pixels, in each pixel column, transistors connected to N pixels (N is an integer greater than or equal to two and less than or equal to twice a quotient obtained by dividing m by 1080) adjacent to each other are connected to the first source bus line arranged corresponding to that pixel column, and transistors connected to N pixels adjacent to each other that are adjacent in the column direction to the above-mentioned N pixels are connected to the first source bus line arranged corresponding to a pixel column adjacent to that pixel column.

In one embodiment, the plurality of source bus lines include first source bus lines and second source bus lines arranged corresponding to pixel columns so that polarities of the first display signal voltages supplied thereto are opposite to each other in each vertical scanning period and polarities of the second display signal voltages supplied thereto are opposite to each other in each vertical scanning period.

In one embodiment, polarities of the first display signal voltage supplied to two pixels adjacent to each other in the row direction are opposite to each other in each vertical scanning period, and polarities of the second display signal voltage supplied to two pixels adjacent to each other in the row direction are opposite to each other in each vertical scanning period.

In one embodiment, in each pixel row, one of two pixels adjacent to each other in the row direction is connected to the first source bus line with the other pixel connected to the second source bus line.

In one embodiment, in each pixel row, both of two pixels adjacent to each other in the row direction are connected to the first source bus line or the second source bus line.

In one embodiment, in each pixel column, a transistor connected to a predetermined pixel is connected to the first source bus line arranged corresponding to that pixel column, and a transistor connected to a pixel that is adjacent in the column direction to the predetermined pixel is connected to the second source bus line arranged corresponding to that pixel column.

In one embodiment, where m is the number of the plurality of rows of the plurality of pixels, in each pixel column, transistors connected to N pixels (N is an integer greater than or equal to two and less than or equal to twice a quotient obtained by dividing m by 1080) adjacent to each other are connected to the first source bus line arranged corresponding to that pixel column, and transistors connected to N pixels adjacent to each other that are adjacent in the column direction to the above-mentioned N pixels are connected to the second source bus line arranged corresponding to that pixel column.

In one embodiment, the number of the plurality of rows of the plurality of pixels is greater than 1080.

In one embodiment, the liquid crystal display panel further includes: a plurality of first buffer circuits provided in the first frame region, each first buffer circuit corresponding to one of the plurality of first source drivers and the source bus lines that are associated with the one of the plurality of first source drivers, and each first buffer circuit including a plurality of first buffers; and a plurality of second buffer circuits provided in the second frame region, each second buffer circuit corresponding to one of the plurality of second source drivers and the source bus lines that are associated with the one of the plurality of second source drivers, and each second buffer circuit including a plurality of second buffers.

In one embodiment, an input line and an output line connected to each of the plurality of first buffers are arranged adjacent to each other, and an input line and an output line connected to each of the plurality of second buffers are arranged adjacent to each other.

In one embodiment, each of the plurality of first buffers includes a first switching mechanism for controlling switching of the first buffer from an inoperative state to an operative state, and each of the plurality of second buffers includes a second switching mechanism for controlling switching of the second buffer from an inoperative state to an operative state.

In one embodiment, the plurality of first and second buffers included in the first and second buffer circuits corresponding to source bus lines, from among the plurality of source bus lines, that have not been broken, are in an inoperative state.

A method for repairing the liquid crystal display panel according to an embodiment of the present invention is a method for repairing any of the liquid crystal display panels set forth above, including the steps of: when a break occurs in one of the plurality of source bus lines, and a distance from a location of the break to the first source driver is greater than a distance from the location of the break to the second source driver, connecting the source bus line in which the break has occurred to one of the plurality of first buffers; and when a break occurs in one of the plurality of source bus lines, and a distance from a location of the break to the second source driver is greater than a distance from the location of the break to the first source driver, connecting the source bus line in which the break has occurred to one of the plurality of second buffers.

In one embodiment, the repair method further includes: a step of switching the first buffer that is to be connected to the source bus line in which the break has occurred from an inoperative state to an operative state by operating the first switching mechanism of the first buffer; or a step of switching the second buffer that is to be connected to the source bus line in which the break has occurred from an inoperative state to an operative state by operating the second switching mechanism of the second buffer.

Advantageous Effects of Invention

Embodiments of the present invention provide a liquid crystal display panel capable of suppressing the heat generation of source drivers and reducing the charging ability that is required for each source driver, and a repair method therefor.

DESCRIPTION OF EMBODIMENTS

Figure 16:
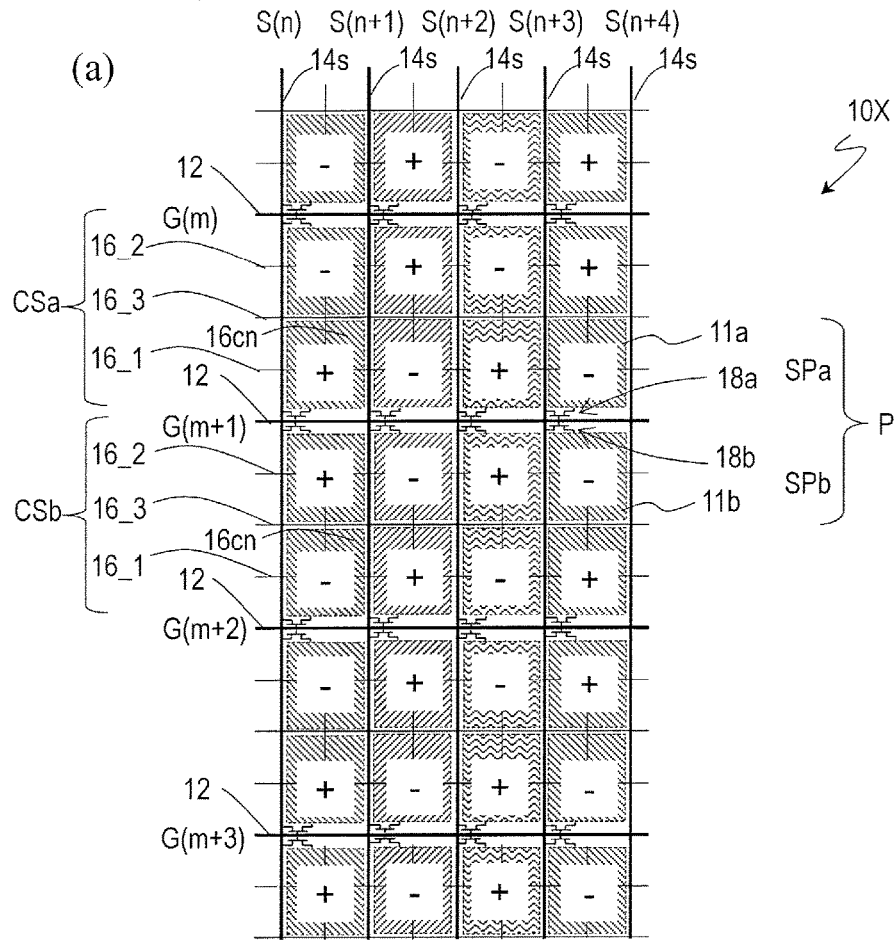
FIG. 16 (a) is a schematic plan view of a TFT substrate 10X used in a liquid crystal display panel of Comparative Example 1, (b) is a diagram showing waveforms of various voltages used for driving the liquid crystal display panel of Comparative Example 1 having the TFT substrate 10X, and (c) is a diagram illustrating a cause for excessive heating of the source driver in the liquid crystal display panel of Comparative Example 1.
Figure 16:
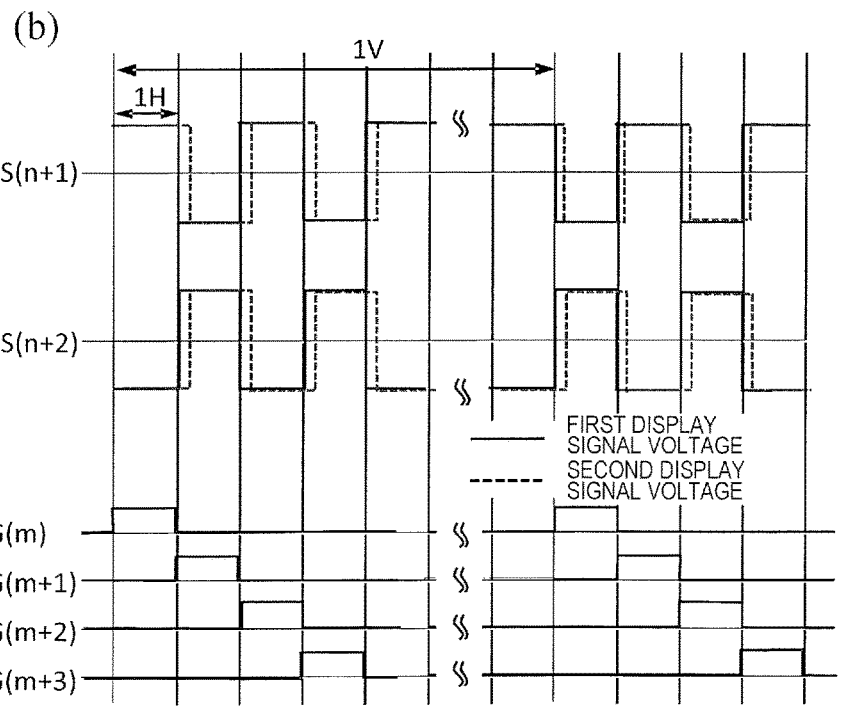
Figure 16:
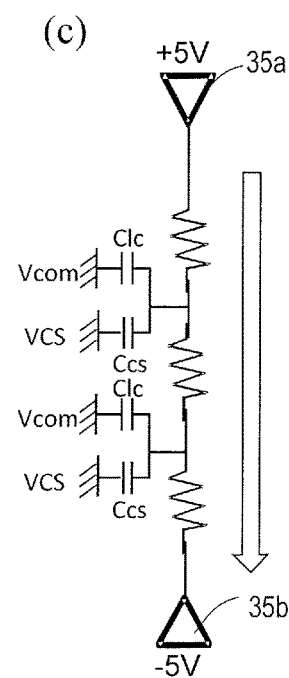

First, the cause for the problem of the source driver heating up excessively (Problem 1), discovered by the present inventors, will be described with reference to FIGS. 16(a) to 16(c). FIG. 16(a) is a schematic plan view of a TFT substrate 10X used in a liquid crystal display panel of Comparative Example 1, showing the electric connections between transistors of pixels and gate bus lines 12 and source bus lines 14s, and showing the polarities of the display signal voltages applied to pixels during a vertical scanning period. FIG. 16(b) is a diagram showing waveforms of various voltages used for driving the liquid crystal display panel of Comparative Example 1 having the TFT substrate 10X. FIG. 16(c) is a diagram illustrating a cause for excessive heating of the source driver in the liquid crystal display panel of Comparative Example 1.

Figure 1:
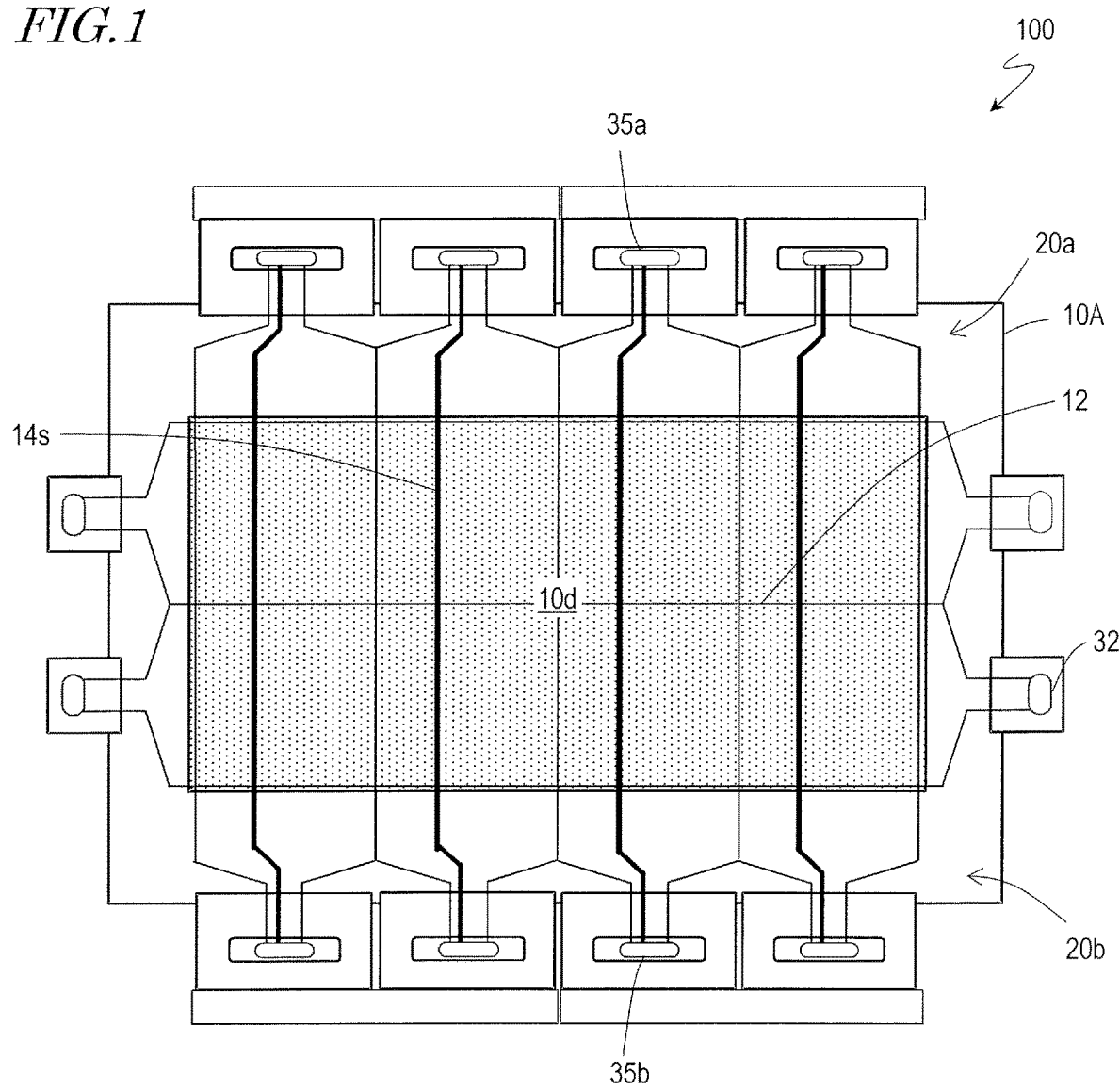
FIG. 1 A schematic plan view of a liquid crystal display panel 100 according to Embodiment 1 of the present invention.

The liquid crystal display panel of Comparative Example 1 has a two-side input driving structure as does a liquid crystal display panel according to an embodiment of the present invention (e.g., a liquid crystal display panel 100 of FIG. 1). In the description of the two-side input driving structure, reference may be made also to FIG. 1. Herein, FIG. 1 is a schematic plan view of the liquid crystal display panel 100 according to Embodiment 1 of the present invention. The liquid crystal display panel of Comparative Example 1 is different from a liquid crystal display panel of an embodiment of the present invention in terms of the electric connections between transistors of pixels and the source bus lines 14s, and/or in terms of the display signal voltages supplied to source bus lines 14s.

The liquid crystal display panel of Comparative Example 1 includes the TFT substrate 10X, a counter substrate (not shown), and a liquid crystal layer (not shown) provided between these substrates. The TFT substrate 10X includes a plurality of pixels arranged in a matrix pattern having a plurality of rows and a plurality of columns, a plurality of transistors, a plurality of gate bus lines 12, and a plurality of source bus lines 14s. Each of the plurality of transistors is connected to one of the plurality of pixels. The plurality of pixels define the display region of the liquid crystal display panel of Comparative Example 1.

As shown in FIG. 16(a), the TFT substrate 10X has a multi-pixel structure, wherein each pixel P includes two sub-pixels SPa and SPb. The two sub-pixels SPa and SPb are arranged along the column direction. The TFT substrate 10X includes two sub-pixel electrodes a first sub-pixel electrode 11a and a second sub-pixel electrode 11b) corresponding to the two sub-pixels (the first sub-pixel SPa and the second sub-pixel SPb). The two sub-pixel electrodes 11a and 11b receive a display signal voltage supplied from a common source bus line 14s via two transistors 18a and 18b that are connected to a common gate bus line 12, for example.

As shown in FIG. 16(a), the plurality of source bus lines 14s are arranged so that each source bus line 14s corresponds to one pixel column. Transistors 18a and 18b that are connected to pixels of each pixel column are connected to the source bus line 14s arranged corresponding to that pixel column. That is, transistors 18a and 18b that are connected to pixels included in the $n^{th}$ pixel column are connected to the source bus line S(n) arranged corresponding to the $n^{th}$ pixel column.

As shown in FIG. 1, the liquid crystal display panel of Comparative Example 1 further includes a first source driver 35a provided in a first frame region 20a on the upper side of the display region for supplying a first display signal voltage to the plurality of source bus lines 14s, and a second source driver 35b provided in a second frame region 20b on the lower side of a display region 10d for supplying a second display signal voltage to the plurality of source bus lines 14s. In each vertical scanning period, each of the plurality of source bus lines 14s receives a first display signal voltage and a second display signal voltage supplied thereto while being superposed on each other. The first display signal voltage and the second display signal voltage are generated from a common input display signal. The first source driver 35a and the second source driver 35b generate a first display signal voltage and a second display signal voltage, respectively, that are to be supplied to each pixel based on the grayscale level that should be displayed by the pixel, which is given by the input display signal. The first display signal voltage and the second display signal voltage generated from the respective source drivers are ideally identical to each other.

FIG. 16(b) shows waveforms of voltages supplied to source bus lines S(n) and gate bus lines G(m). Among the display signal voltages supplied to the source bus lines S(n), the first display signal voltage is shown by a solid line and the second display signal voltage by a broken line. As shown in FIG. 16(b), the first display signal voltage and the second display signal voltage supplied to each source bus line each have its polarity inverted every horizontal scanning period (1H). As a result, as shown in FIG. 16(a), in each vertical scanning period (also called a frame period.), signal voltages that are supplied to pixels adjacent to each other have opposite polarities, thereby exhibiting a state called "dot inversion". Herein, one horizontal scanning period (1H) is the difference (period) between a point in time when one scanning line (gate bus line) is selected and another point in time when the next scanning line is selected in each vertical scanning period.

Since the first display signal voltage and the second display signal voltage are supplied from different source drivers 35a and 35b, there may be a difference in time to supply them to the source bus line 14s as shown in FIG. 16(b). Then, the polarities of the first display signal voltage and the second display signal voltage supplied to the source bus line 14s may be different from each other. As shown in FIG. 16(c), when there is a potential difference between the first source driver 35a and the second source driver 35b, an abnormal current is generated in the direction of the arrow in the figure. The first and second source drivers 35a and 35b were heated excessively in some cases due to the generation of an abnormal current. The first and second source drivers 35a and 35b being heated excessively led to a failure in some cases. This abnormal current cannot be generated on a liquid crystal display panel having a one-side input driving structure.

With the liquid crystal display panel of Comparative Example 1, since the polarities of the first display signal voltage and the second display signal voltage are inverted every horizontal scanning period (1H), the polarities of the first display signal voltage and the second display signal voltage are frequently different from each other, and there is frequently a potential difference between the first source driver and the second source driver. For example, an abnormal current may possibly occur every horizontal scanning period (1H). On the other hand, if one elongates the cycle of polarity oscillation of the first display signal voltage and the second display signal voltage, the display quality may lower. For example, if the polarities of the first display signal voltage and the second display signal voltage are inverted every vertical scanning period (1V), signal voltages supplied to pixels adjacent to each other have the same polarity in each vertical scanning period (frame period), which may cause flicker.

A liquid crystal display panel and a repair method therefor according to embodiments of the present invention will now be described with reference to the drawings. The present invention is not limited to the embodiments illustrated below. Elements having substantially the same function will be denoted by like reference signs in the following figures, and the description thereof may be omitted.

Embodiment 1

Figure 2:
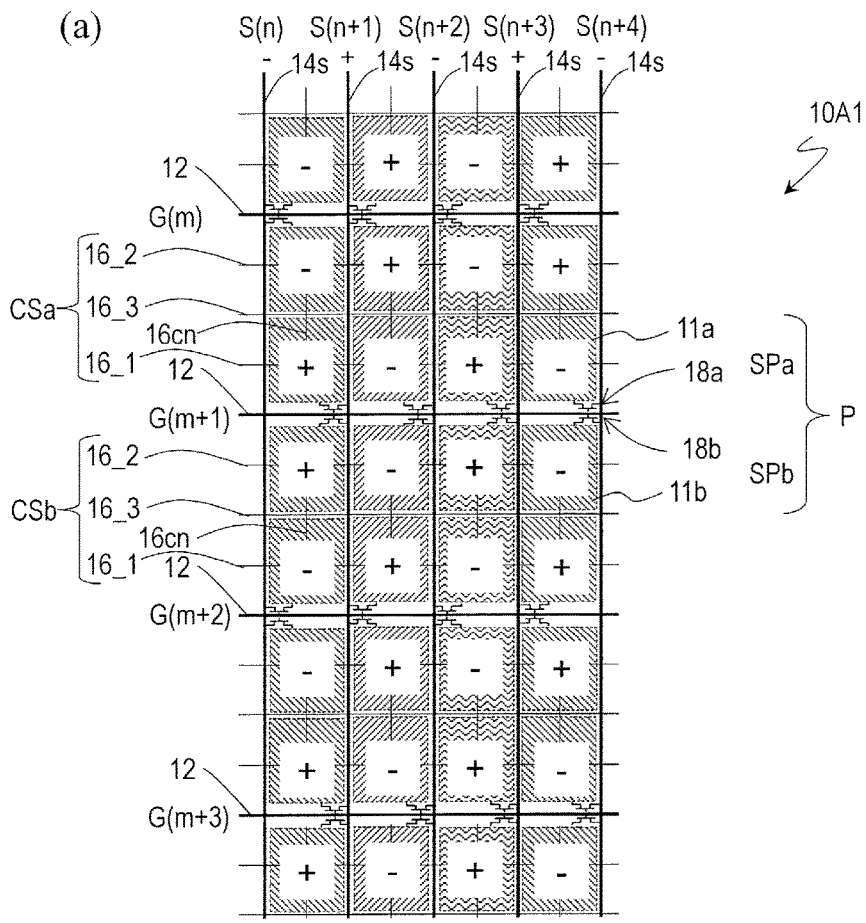
FIG. 2 (a) is a schematic plan view of a TFT substrate 10A1 used in the liquid crystal display panel 100, and (b) is a diagram showing waveforms of various voltages used for driving a liquid crystal display panel having the TFT substrate 10A1.
Figure 2:
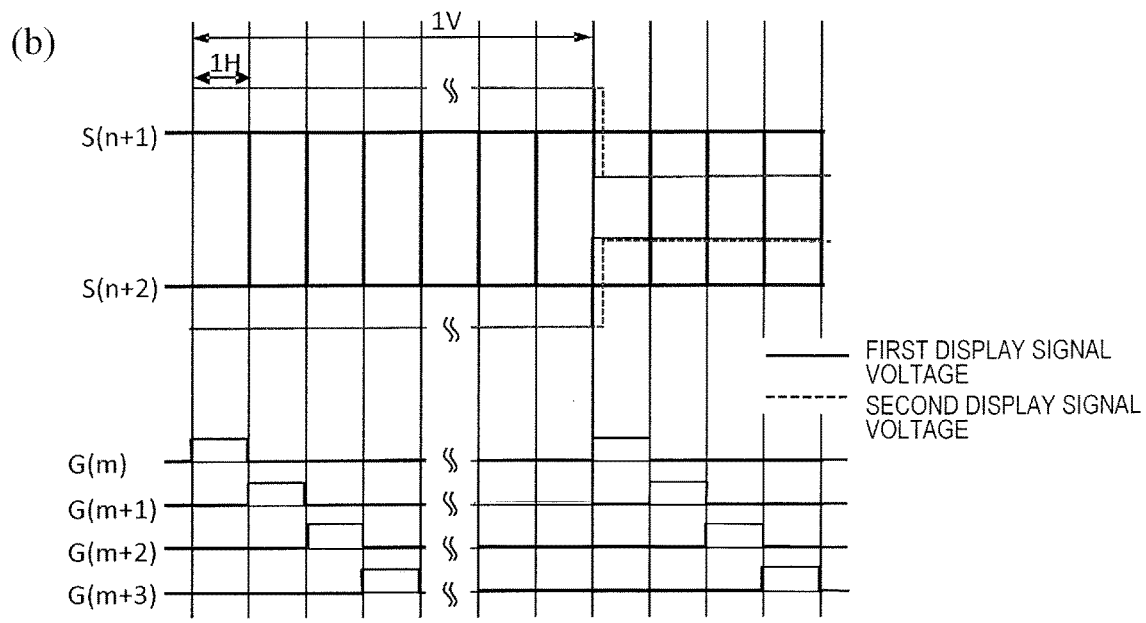

Referring to FIG. 1 and FIG. 2, a liquid crystal display panel 100 according to Embodiment 1 of the present invention will be described. FIG. 1 is a schematic plan view of the liquid crystal display panel 100 according to Embodiment 1 of the present invention. FIG. 2(a) is a schematic plan view of a TFT substrate 10A1 used in the liquid crystal display panel 100, and FIG. 2(b) is a diagram showing waveforms of various voltages used for driving the liquid crystal display panel having the TFT substrate 10A1.

As shown in FIG. 1, the liquid crystal display panel 100 includes the TFT substrate 10A1, a counter substrate (not shown), and a liquid crystal layer (not shown) provided between these substrates. The TFT substrate 10A1 includes a plurality of pixels arranged in a matrix pattern having a plurality of rows and a plurality of columns, a plurality of transistors, a plurality of gate bus lines 12, and a plurality of source bus lines 14s.

Each of the plurality of transistors is connected to one of the plurality of pixels. The plurality of pixels define the display region 10d of the liquid crystal display panel 100. Formed in a region of the TFT substrate 10A1 corresponding to the display region 10d of the liquid crystal display panel 100 are pixel electrodes arranged in a matrix pattern (see, for example, the sub-pixel electrodes 11a and 11b of FIG. 2(a)), transistors whose drain electrodes are connected to the pixel electrodes (see, for example, the transistors 18a and 18b of FIG. 2(a)), the gate bus lines 12 connected to the gate electrodes of the transistors, and the source bus lines 14s connected to the source electrodes of the transistors. Each of the plurality of gate bus lines 12 extends in the row direction and is connected to one or more of the plurality of transistors. Each of the plurality of source bus lines 14s extends in the column direction and is connected to one or more of the plurality of transistors. The electric connections between the transistors of the pixels and the gate bus lines 12 and the source bus lines 14s will be described with reference to FIG. 2 to FIG. 4.

The liquid crystal display panel 100 includes gate drivers 32 on the right side or the left side of the display region 10d, for example. Gate signal voltages are supplied from the gate drivers 32 to the plurality of gate bus lines 12. The gate drivers 32 may be provided either on the right side or the left side of the display region 10d, or may be provided on both sides. There may be provided a plurality of gate drivers 32. When a plurality of gate drivers 32 are provided on the right side or the left side of the display region 10d, each of the gate drivers 32 supplies a gate signal voltage to gate bus lines, from among the plurality of gate bus lines 12, that are associated with the gate driver 32.

The liquid crystal display panel 100 further includes the plurality of first source drivers 35a provided in the first frame region 20a on the upper side of the display region 10d, and the plurality of second source drivers 35b provided in the second frame region 20b on the lower side of the display region 10d. Each of the plurality of first source drivers 35a supplies a first display signal voltage to source bus lines, from among the plurality of source bus lines 14s, that are associated with the first source driver 35a. Each of the plurality of second source drivers 35b supplies a second display signal voltage to source bus lines, from among the plurality of source bus lines 14s, that are associated with the second source driver 35b. In each vertical scanning period, each of the plurality of source bus lines 14s receives a first display signal voltage and a second display signal voltage supplied thereto while being superposed on each other. The polarities of the first display signal voltage and the second display signal voltage do not change within each vertical scanning period.

For each of the plurality of first source drivers 35a, a plurality of source bus lines that are associated with the first source driver 35a refers to those source bus lines that are electrically connected to the first source driver 35a, for example. For each of the plurality of second source drivers 35b, a plurality of source bus lines that are associated with the second source driver 35b refers to those source bus lines that are electrically connected to the second source driver 35b, for example.

Since the liquid crystal display panel 100 has a two-side input driving structure, the charging ability that is required for each source driver is reduced as compared with a liquid crystal display panel having a one-side input driving structure. That is, the liquid crystal display panel 100 has a high charging ability, as compared with a liquid crystal display panel having a one-side input driving structure. The evaluation of the charging ability of the liquid crystal display panel 100 will be described later.

The gate drivers 32 and the source drivers 35a and 35b are mounted on the TFT substrate 10A by using COF (chip on film), as shown in the figure. The first frame region 20a and the second frame region 20b may include COF. The present embodiment is not limited to this, and the gate drivers 32 and/or the source drivers 35a and 35b may be mounted on the TFT substrate 10A by using COG (chip on glass). The first frame region 20a and the second frame region 20b may be included in the TFT substrate 10A.

The first display signal voltage and the second display signal voltage are generated from a common input display signal. The first source driver 35a and the second source driver 35b generate a first display signal voltage and a second display signal voltage, respectively, that are to be supplied to each pixel based on the grayscale level to be displayed by the pixel, which is given by the input display signal. The first display signal voltage and the second display signal voltage generated from the first source driver 35a and the second source driver 35b are ideally identical to each other.

With the liquid crystal display panel 100, the polarities of the first display signal voltage and the second display signal voltage, which are supplied to each source bus line 14s while being superposed on each other, do not change within each vertical scanning period. With the liquid crystal display panel 100, the frequency with which the polarities of the first display signal voltage and the second display signal voltage, which are supplied to each source bus line 14s, are different from each other is lower than that with the liquid crystal display panel of Comparative Example 1, thereby suppressing the heat generation of source drivers. The frequency with which the polarities of the first display signal voltage and the second display signal voltage, which are supplied to each source bus line 14s, are different from each other is at most once every vertical scanning period (1V), for example. With a 4K2K (which may be referred to simply as "4K") (about 4000 pixels in the horizontal direction by about 2000 pixels in the vertical direction) panel, for example, the value of the frequency with which the polarities of the first display signal voltage and the second display signal voltage are different from each other is about ½000 for the liquid crystal display panel 100 when the value is 1 for the liquid crystal display panel of Comparative Example 1.

Referring to FIG. 2(a), the electric connections between the transistors of the pixels and the gate bus lines 12 and the source bus lines 14s will be described. FIG. 2(a) shows the electric connections between the transistors of the pixels and the gate bus lines 12 and the source bus lines 14s, and the polarities of the display signal voltages applied to pixels during a vertical scanning period.

The TFT substrate 10A1 has a multi-pixel structure, wherein each pixel P includes two sub-pixels SPa and SPb. The two sub-pixels SPa and SPb are arranged along the column direction. The two sub-pixels SPa and SPb are capable of exhibiting different grayscale levels (brightnesses) from each other. In accordance with the source signal voltage (grayscale level signal voltage) input to the pixel P, one sub-pixel SPa exhibits a higher grayscale level while the other sub-pixel SPb exhibits a lower grayscale level with respect to the grayscale level that should be displayed by the pixel P so that the pixel P as a whole exhibits the grayscale level in accordance with the input source signal voltage. The multi-pixel structure can be used particularly suitably for a liquid crystal display panel of a vertical alignment mode, and is capable of improving the viewing angle dependence of the gamma characteristics. A structure of a liquid crystal display panel having a multi-pixel structure and a method for driving the same are described in Japanese Laid-Open Patent Publication No. 2005-189804 (Japanese Patent No. 4265788) by the present applicant, for example. The entire disclosure of Japanese Laid-Open Patent Publication No. 2005-189804 is herein incorporated by reference.

The TFT substrate 10A1 includes two sub-pixel electrodes (the first sub-pixel electrode 11a and the second sub-pixel electrode 11b) corresponding to two sub-pixels (the first sub-pixel SPa and the second sub-pixel SPb). The two sub-pixel electrodes 11a and 11b receive a display signal voltage supplied from a common source bus line 14s via two transistors 18a and 18b that are connected to a common gate bus line 12, for example. Needless to say, the two transistors 18a and 18b can be turned ON/OFF at the same time, and do not always need to be connected to a common gate bus line 12. This similarly applies also to the source bus line 14s. Note however that an increase in the number of gate bus lines and/or source bus lines may lead to a decrease in the aperture ratio. Therefore, it is preferred that two transistors 18a and 18b that correspond respectively to two sub-pixels SPa and SPb forming one pixel P are connected to a common gate bus line 12 and a common source bus line 14s.

The liquid crystal display panel 100 has a single-source structure. The plurality of source bus lines 14s include source bus lines (which may be referred to as "first source bus lines") 14s that are arranged corresponding to pixel columns. A source bus line arranged corresponding to the $n^{th}$ pixel column (i.e., a plurality of pixels arranged in the column direction) may be designated as S(n). With the liquid crystal display panel 100, transistors 18a, 18b that are connected to two pixels adjacent to each other in the column direction are connected to different first source bus lines from each other. Transistors 18a, 18b that are connected to two pixels adjacent to each other in the row direction are connected to different source bus lines 14s from each other. The polarities of the first display signal voltages supplied to two source bus lines 14s adjacent to each other are opposite to each other in each vertical scanning period, and the polarities of the second display signal voltages supplied to two source bus lines 14s adjacent to each other are opposite to each other in each vertical scanning period. As described above, in each vertical scanning period, the first display signal voltage and the second display signal voltage are supplied to each of the plurality of source bus lines 14s while being superposed on each other, and the polarities of the first display signal voltage and the second display signal voltage do not change within each vertical scanning period. Therefore, as shown in FIG. 2(a), in each vertical scanning period (also called a frame period.), signal voltages that are supplied to pixels adjacent to each other have opposite polarities, thereby exhibiting a dot inversion state. Since the liquid crystal display panel 100 can suppress the occurrence of flicker, it is possible to suppress the heat generation of source drivers without lowering the display quality.

FIG. 2(b) shows waveforms of voltages supplied to source bus lines S(n) and gate bus lines G(m). A gate bus line arranged corresponding to the $m^{th}$ pixel row (i.e., a plurality of pixels arranged in the row direction) may be designated as G(m). Among the display signal voltages supplied to the source bus lines S(n), the first display signal voltage is shown by a solid line and the second display signal voltage by a broken line. As shown in FIG. 2(b), the first display signal voltage and the second display signal voltage supplied to each source bus line each have its polarity inverted every vertical scanning period (1V) (the cycle is 2V). That is, the polarity of the display signal voltage applied to each pixel during a vertical scanning period is as shown in FIG. 2(a), and the polarity of the display signal voltage applied to each pixel is inverted during the next vertical scanning period. The present embodiment is not limited to this, and the cycle with which the polarities of the first display signal voltage and the second display signal voltage are inverted may be 4V or more, for example. When the cycle with which the polarities of the first display signal voltage and the second display signal voltage are inverted is long, it is possible to further reduce the frequency with which an abnormal current occurs and to reduce the power consumption.

Now, the charging ability of the liquid crystal display panel is evaluated. It is assumed that the charging ability of the liquid crystal display panel is in proportion to the charging time per pixel and is in inverse proportion to the source bus line load per source driver (the product of capacitance and resistance (also called "RC time constant".)). With the increase in the size and/or the definition of liquid crystal display panels, there is a demand for improving the charging ability of liquid crystal display panels.

The liquid crystal display panel 100 has a two-side input driving structure and therefore has a higher charging ability than a liquid crystal display panel having a one-side input driving structure (which may be referred to as the "liquid crystal display panel of Comparative Example 2"). The source bus line load per source driver is ¼ for the liquid crystal display panel 100, assuming that it is 1 for the liquid crystal display panel of Comparative Example 2, as will be described below. With the liquid crystal display panel 100, since source drivers are connected on both sides of source bus lines, each source driver drives substantially a half of each source bus line. Therefore, for each source driver, the source bus line resistance is ½ and the source bus line capacitance is ½, and the source bus line load, which is the product thereof, is ¼. Since the liquid crystal display panel 100 and the liquid crystal display panel of Comparative Example 2 both have a single-source structure, they have the same charging time per pixel. Thus, the charging ability of the liquid crystal display panel 100 can be evaluated to be four times that of the liquid crystal display panel of Comparative Example 2.

With the liquid crystal display panel 100 having a multi-pixel structure, the first sub-pixel SPa has a first storage capacitor and the second sub-pixel SPb has a second storage capacitor. By supplying storage capacitor voltages that are different from each other from a storage capacitor bus line CSa connected to the first storage capacitor of the first sub-pixel SPa and from a storage capacitor bus line CSb connected to the second storage capacitor of the second sub-pixel SPb, the effective voltage applied across the liquid crystal layer of the first sub-pixel SPa is made different from the effective voltage applied across the liquid crystal layer of the second sub-pixel SPb. Herein, the storage capacitor bus lines CSa and CSb are electrically independent of the gate bus line 12. Note that for the liquid crystal display panel 100 as a whole, there are 12 types of storage capacitor bus lines, for example, that are electrically independent of each other (as are the storage capacitor bus lines CSa and CSb), and a storage capacitor voltage is supplied to a storage capacitor electrode of a corresponding sub-pixel based on the phase of the storage capacitor voltage. For example, 12 types of storage capacitor voltages are supplied to the storage capacitor bus lines from 12 storage capacitor trunk lines.

With a typical liquid crystal display panel, since the same voltage is applied to the storage capacitor as that applied to the liquid crystal capacitor, the same voltage as that to the pixel electrode is applied to one of a pair of electrodes of the storage capacitor while the same voltage (common voltage) as that to the common electrode (counter electrode) is supplied to the other electrode. In contrast, with a liquid crystal display panel having a multi-pixel structure, oscillating voltages (voltages that oscillate within one vertical scanning period) that are different from each other are supplied from the storage capacitor bus lines CSa and CSb described above. The oscillating voltages are typically voltages whose phases are different from each other by 180° between the storage capacitor bus line CSa and the storage capacitor bus line CSb. Note that one of the pair of electrodes of the storage capacitor that is connected to the storage capacitor bus line may be referred to also as a storage capacitor counter electrode.

The storage capacitor bus lines and the storage capacitor electrodes connected thereto are formed from the same metal layer as the gate bus line (called a gate metal layer.), for example. The dielectric layer of the storage capacitor is formed from a gate insulating layer, for example. The electrode formed on the dielectric layer on the storage capacitor electrode is formed from the same conductive layer as the pixel electrode (sub-pixel electrode) or the same metal layer as the source bus line (source metal layer), and is electrically connected to the drain of the TFT or the pixel electrode (sub-pixel electrode). The structure of such storage capacitors is well known in the art, and therefore will not be shown in the figures.

As shown in FIG. 2(a), for example, each of the storage capacitor bus lines CSa and CSb of the TFT substrate 10A1 includes a first storage capacitor bus line 16_1 that is connected to the first storage capacitor (the storage capacitor included in the first sub-pixel SPa) belonging to one pixel row (i.e., a plurality of pixels arranged in the row direction) and that extends in the row direction, a second storage capacitor bus line 16_2 that is connected to the second storage capacitor (the storage capacitor included in the second sub-pixel SPb) belonging to one pixel row and that extends in the row direction, and a third storage capacitor bus line 16_3 that is provided to be parallel to the first storage capacitor bus line 16_1 and the second storage capacitor bus line 16_2 that are associated with pixel rows adjacent to each other and that is electrically connected to that first storage capacitor bus line 16_1 and that second storage capacitor bus line 16_2.

Where two pixels arranged in the column direction are denoted as a $k^{th}$-row pixel and a $k+1^{th}$-row pixel, each pixel including the first sub-pixel SPa and the second sub-pixel SPb arranged next to the first sub-pixel SPa in the column direction, each of the storage capacitor bus lines CSa and CSb includes the second storage capacitor bus line 16_2 associated with the second sub-pixel SPb of the $k^{th}$-row pixel, the first storage capacitor bus line 16_1 associated with the first sub-pixel SPa of the $k+1^{th}$-row pixel, the third storage capacitor bus line 16_3 provided between that second storage capacitor bus line 16_2 and that first storage capacitor bus line 16_1, and a storage capacitor connection line 16cn for electrically connecting these lines together. The storage capacitor connection line 16cn is electrically connected to the storage capacitor electrodes of the first storage capacitor (the storage capacitor included in the first sub-pixel SPa) and the second storage capacitor (the storage capacitor included in the second sub-pixel SPb).

Thus, as the storage capacitor bus lines CSa and CSb each have a branching structure (including the ladder structure) including a plurality of lines, it is possible to reduce the resistances of the storage capacitor bus lines CSa and CSb. Therefore, even with high-definition and/or large-size liquid crystal display panels, it is possible to suppress the delay of storage capacitor voltages and the occurrence of waveform blunting.

While the liquid crystal display panel 100 has a multi-pixel structure in the example described above, the present embodiment is not limited thereto.

For example, the multi-pixel structure and/or the multi-pixel driving method of the liquid crystal display panel of the present embodiment are not limited to those illustrated herein. That is, the method for exhibiting different grayscale levels (brightnesses) from each other on two sub-pixels of each pixel is not limited to the method illustrated herein. For example, one of the sub-pixels may include another transistor and a capacitor connected thereto, in addition to the transistor and the storage capacitor connected to each sub-pixel, thereby realizing multi-pixel driving. A multi-pixel structure in which each pixel includes three transistors as described above is disclosed in FIG. 8 and FIG. 9 of Japanese Laid-Open Patent Publication No. 2013-250545, for example.

The liquid crystal display panel of the present embodiment does not need to have a multi-pixel structure. The liquid crystal display panel of the present embodiment does not need to perform multi-pixel driving.

The liquid crystal display panel of the present embodiment is not limited to the vertical alignment mode (VA mode). The liquid crystal display panel of the present embodiment may be of a transverse electric field mode (including the IPS mode and the FFS mode).

While the transistor of the liquid crystal display panel 100 may be any TFT known in the art, such as an amorphous silicon TFT (a-Si TFT), a polysilicon TFT (p-Si TFT) and a microcrystalline silicon TFT (μC-Si TFT), it is preferred to use a TFT having an oxide semiconductor layer (oxide TFT).

The oxide semiconductor included in the oxide semiconductor layer may be an amorphous oxide semiconductor or a crystalline oxide semiconductor having a crystalline portion. Examples of the crystalline oxide semiconductor include a polycrystalline oxide semiconductor, a microcrystalline oxide semiconductor, a crystalline oxide semiconductor whose c-axis is aligned generally vertical to the layer surface, etc.

The oxide semiconductor layer may have a layered structure of two or more layers. When the oxide semiconductor layer has a layered structure, the oxide semiconductor layer may include an amorphous oxide semiconductor layer and a crystalline oxide semiconductor layer. Alternatively, it may include a plurality of crystalline oxide semiconductor layers having different crystalline structures. Alternatively, it may include a plurality of amorphous oxide semiconductor layers. When the oxide semiconductor layer has a 2-layer structure including an upper layer and a lower layer, the energy gap of the oxide semiconductor included in the upper layer is preferably greater than the energy gap of the oxide semiconductor included in the lower layer. Note however that when the energy gap difference between these layers is relatively small, the energy gap of the oxide semiconductor of the lower layer may be greater than the energy gap of the oxide semiconductor of the upper layer.

The material, the structure and the deposition method of the amorphous oxide semiconductor, those of the crystalline oxide semiconductors described above, and the structure of the oxide semiconductor layer having a layered structure, etc., are described in Japanese Laid-Open Patent Publication No. 2014-007399, for example. The entire disclosure of Japanese Laid-Open Patent Publication No. 2014-007399 is herein incorporated by reference.

The oxide semiconductor layer may include at least one metal element from among In, Ga and Zn, for example. The oxide semiconductor layer includes an In—Ga—Zn—O-based semiconductor (e.g., indium gallium zinc oxide), for example. Herein, the In—Ga—Zn—O-based semiconductor is a ternary oxide of In (indium), Ga (gallium) and Zn (zinc), and there is no particular limitation on the ratio (composition ratio) between In, Ga and Zn, e.g., In:Ga:Zn=2:2:1, In:Ga:Zn=1:1:1, In:Ga:Zn=1:1:2, etc. Such an oxide semiconductor layer may be formed from an oxide semiconductor film including an In—Ga—Zn—O-based semiconductor. Note that a channel-etched-type TFT having an active layer including an oxide semiconductor, such as an In—Ga—Zn—O-based semiconductor, may be referred to as a "CE-OS-TFT".

The In—Ga—Zn—O-based semiconductor may be amorphous or crystalline. The crystalline In—Ga—Zn—O-based semiconductor is preferably a crystalline In—Ga—Zn—O-based semiconductor whose c-axis is aligned generally vertical to the layer surface, etc.

Note that the crystalline structure of the crystalline In—Ga—Zn—O-based semiconductor is disclosed for example in Japanese Laid-Open Patent Publication No. 2014-007399, Japanese Laid-Open Patent Publication No. 2012-134475, Japanese Laid-Open Patent Publication No. 2014-209727, etc., mentioned above. The entire disclosures of Japanese Laid-Open Patent Publication No. 2012-134475 and Japanese Laid-Open Patent Publication No. 2014-209727 are herein incorporated by reference. A TFT including an In—Ga—Zn—O-based semiconductor layer, which has a high mobility (greater than 20 times that of an a-Si TFT) and a lower leak current (less than 1/100 that of an a-Si TFT), can suitably be used as a driver TFT (e.g., a TFT included in the driving circuit provided around the display region including a plurality of pixels therein and on the same substrate as the display region) and a pixel TFT (a TFT provided in a pixel).

The oxide semiconductor layer may include any other oxide semiconductor instead of an In—Ga—Zn—O-based semiconductor. For example, it may include an In—Sn—Zn—O-based semiconductor (e.g., $In_2O_3$—$SnO_2$—ZnO; InSnZnO). The In—Sn—Zn—O-based semiconductor is a ternary oxide of In (indium), Sn (tin) and Zn (zinc). Alternatively, the oxide semiconductor layer may include an In—Al—Zn—O-based semiconductor, an In—Al—Sn—Zn—O-based semiconductor, a Zn—O-based semiconductor, an In—Zn—O-based semiconductor, a Zn—Ti—O-based semiconductor, a Cd—Ge—O-based semiconductor, a Cd—Pb—O-based semiconductor, CdO (cadmium oxide), an Mg—Zn—O-based semiconductor, an In—Ga—Sn—O-based semiconductor, an In—Ga—O-based semiconductor, a Zr—In—Zn—O-based semiconductor, an Hf—In—Zn—O-based semiconductor, an Al—Ga—Zn—O-based semiconductor, a Ga—Zn—O-based semiconductor, etc.

Although the liquid crystal display panel 100 exhibits a dot inversion state (one-row, one-column dot inversion state) in the example described above, the present embodiment is not limited thereto. As will be shown below, the liquid crystal display panel according to the present embodiment may exhibit an N-row, one-column dot inversion state (N is an integer greater than or equal to two). A case where N=2 will be described with reference to FIG. 3, and a case where N is greater than or equal to three will be described with reference to FIG. 4.

Figure 3:
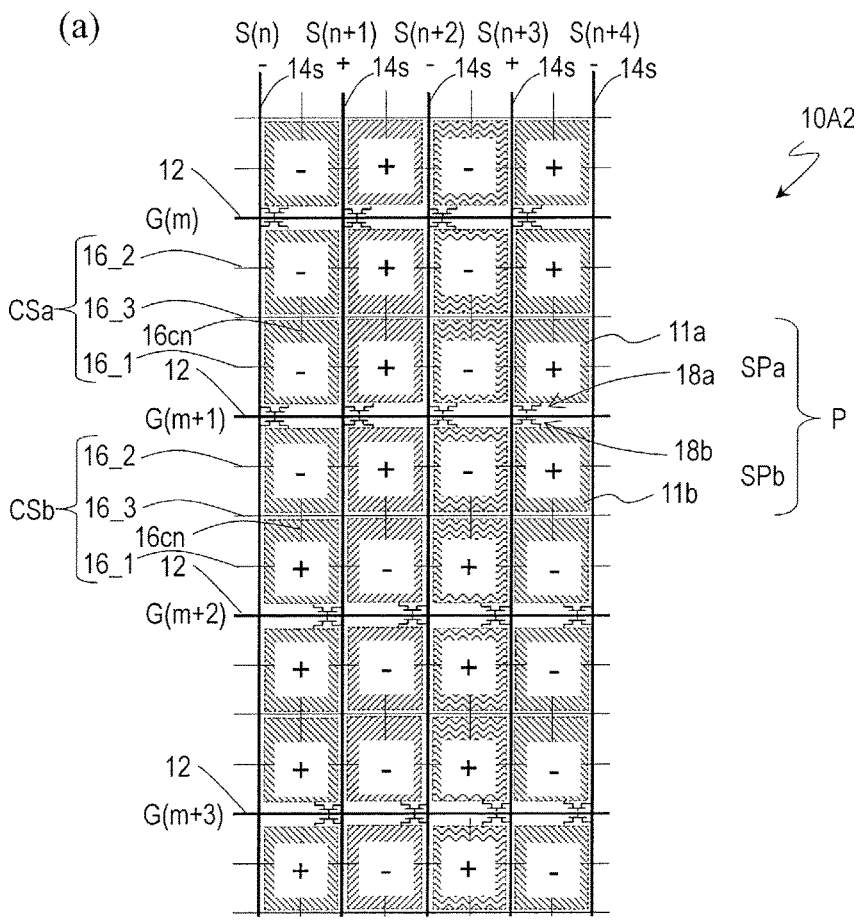
FIG. 3 (a) is a schematic plan view of a TFT substrate 10A2 used in a liquid crystal display panel according to Embodiment 1 of the present invention, and (b) is a diagram showing waveforms of various voltages used for driving a liquid crystal display panel having the TFT substrate 10A2.
Figure 3:
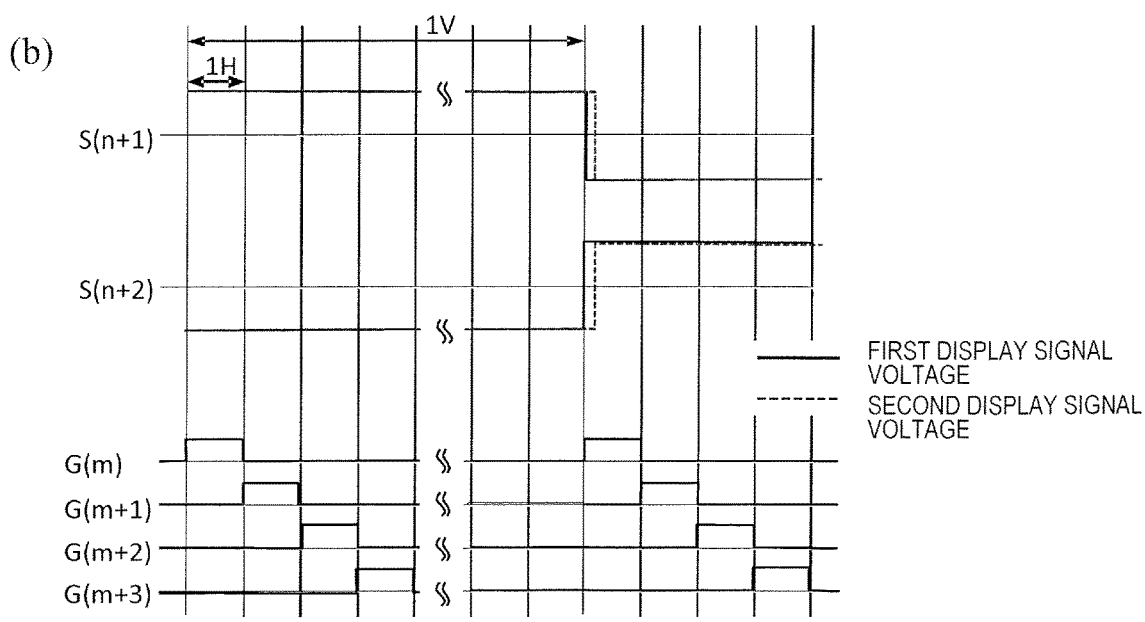

Referring to FIG. 3, another example of the present embodiment will be described. FIG. 3(a) is a schematic plan view of the TFT substrate 10A2 used in the liquid crystal display panel according to Embodiment 1, showing the electric connections between the transistors of the pixels and the gate bus lines 12 and the source bus lines 14s, and the polarities of the display signal voltages applied to pixels during a vertical scanning period. FIG. 3(b) is a diagram showing waveforms of various voltages used for driving the liquid crystal display panel having the TFT substrate 10A2.

As shown in FIG. 3(a), the liquid crystal display panel according to Embodiment 1 having the TFT substrate 10A2 is different from the liquid crystal display panel 100 having the TFT substrate 10A1 in that it exhibits a two-row, one-column dot inversion state. That is, for each pixel column (which is assumed to be the $n^{th}$ pixel column.) of the TFT substrate 10A2, the transistors 18a and 18b connected to two pixels adjacent to each other are connected to the first source bus line S(n) arranged corresponding to that pixel column (the $n^{th}$ pixel column), and the transistors 18a and 18b connected to two pixels adjacent to each other that are adjacent in the column direction to the above-mentioned two pixels are connected to the first source bus line S(n+1) arranged corresponding to a pixel column (the $n+1^{th}$ pixel column) that is adjacent to that pixel column. The liquid crystal display panel according to Embodiment 1 having the TFT substrate 10A2 may be the same as the liquid crystal display panel 100 except for the electric connections between the transistors of the pixels and the source bus lines.

Since the liquid crystal display panel according to Embodiment 1 having the TFT substrate 10A2 has a two-side input driving structure, the charging ability that is required for each source driver is reduced as compared with a liquid crystal display panel having a one-side input driving structure.

With the liquid crystal display panel according to Embodiment 1 having the TFT substrate 10A2, the polarities of the first display signal voltage and the second display signal voltage, which are supplied to each source bus line 14s while being superposed on each other, do not change within each vertical scanning period. With the liquid crystal display panel according to Embodiment 1 having the TFT substrate 10A2, the frequency with which the polarities of the first display signal voltage and the second display signal voltage, which are supplied to each source bus line 14s, are different from each other is lower than that with the liquid crystal display panel of Comparative Example 1, thereby suppressing the heat generation of source drivers.

Since the liquid crystal display panel according to Embodiment 1 having the TFT substrate 10A2 exhibits a two-row, one-column dot inversion state in each vertical scanning period, flicker is suppressed. Note however that with the resolution being equal, a one-row, one-column dot inversion state is more preferred than a two-row, one-column dot inversion state in view of suppressing the occurrence of flicker.

Figure 4:
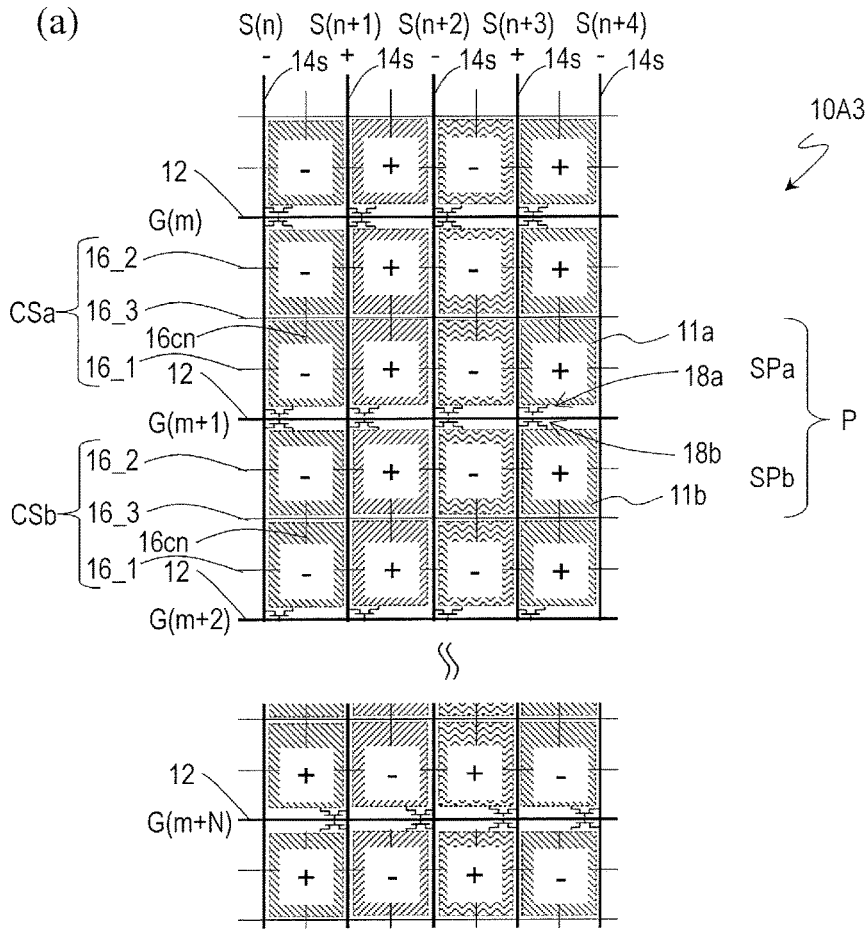
FIG. 4 (a) is a schematic plan view of a TFT substrate 10A3 used in a liquid crystal display panel according to Embodiment 1 of the present invention, and (b) is a diagram showing waveforms of various voltages used for driving a liquid crystal display panel having the TFT substrate 10A3.
Figure 4:
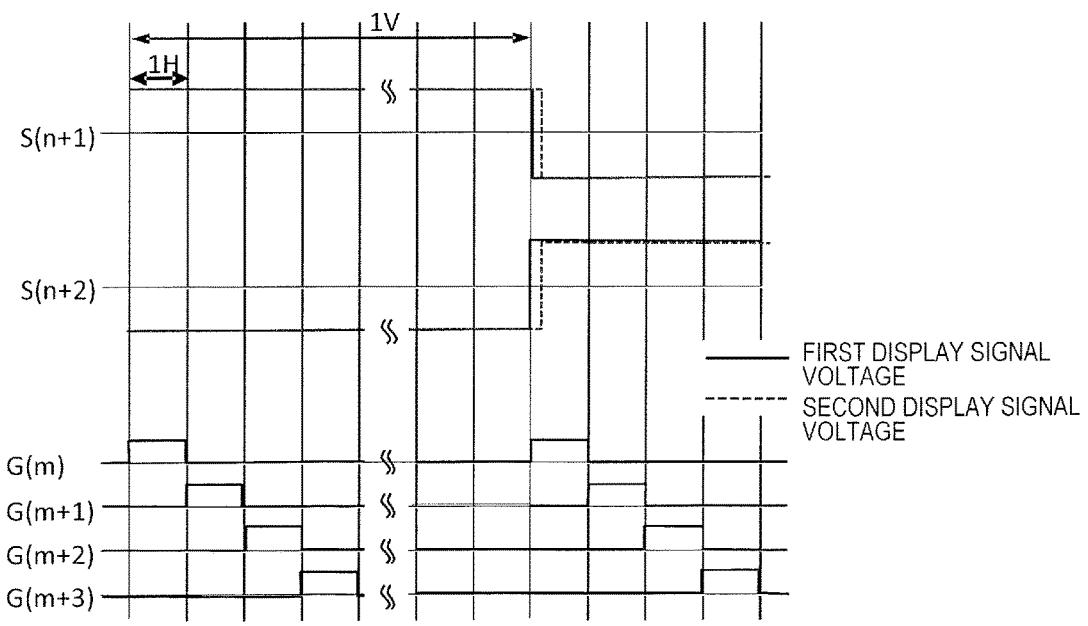

Referring to FIG. 4, still another example of the present embodiment will be described. FIG. 4(a) is a schematic plan view of the TFT substrate 10A3 used in the liquid crystal display panel according to Embodiment 1, showing the electric connections between the transistors of the pixels and the gate bus lines 12 and the source bus lines 14s, and the polarities of the display signal voltages applied to pixels during a vertical scanning period. FIG. 4(b) is a diagram showing waveforms of various voltages used for driving the liquid crystal display panel having the TFT substrate 10A3.

As shown in FIG. 4(a), the liquid crystal display panel according to Embodiment 1 having the TFT substrate 10A3 is different from the liquid crystal display panel 100 having the TFT substrate 10A1 in that it exhibits an N-row, one-column dot inversion state (N is an integer greater than or equal to three). That is, for each pixel column (which is assumed to be the $n^{th}$ pixel column.) of the TFT substrate 10A3, the transistors 18a and 18b connected to N pixels adjacent to each other are connected to the first source bus line S(n) arranged corresponding to that pixel column (the $n^{th}$ pixel column), and the transistors 18a and 18b connected to N pixels adjacent to each other that are adjacent in the column direction to the above-mentioned N pixels are connected to the first source bus line S(n+1) arranged corresponding to a pixel column (the $n+1^{th}$ pixel column) that is adjacent to that pixel column. The liquid crystal display panel according to Embodiment 1 having the TFT substrate 10A3 may be the same as the liquid crystal display panel 100 except for the electric connections between the transistors of the pixels and the source bus lines.

Since the liquid crystal display panel according to Embodiment 1 having the TFT substrate 10A3 has a two-side input driving structure, the charging ability that is required for each source driver is reduced as compared with a liquid crystal display panel having a one-side input driving structure.

With the liquid crystal display panel according to Embodiment 1 having the TFT substrate 10A3, the polarities of the first display signal voltage and the second display signal voltage, which are supplied to each source bus line 14s while being superposed on each other, do not change within each vertical scanning period. With the liquid crystal display panel according to Embodiment 1 having the TFT substrate 10A3, the frequency with which the polarities of the first display signal voltage and the second display signal voltage, which are supplied to each source bus line 14s, are different from each other is lower than that with the liquid crystal display panel of Comparative Example 1, thereby suppressing the heat generation of source drivers.

The liquid crystal display panel according to Embodiment 1 having the TFT substrate 10A3 exhibits an N-row, one-column dot inversion state in each vertical scanning period. With the resolution being equal, a one-row, one-column dot inversion state is more preferred than an N-row, one-column dot inversion state in view of suppressing the occurrence of flicker. However, with high-definition display panels having resolutions exceeding FHD (the number of pixels is 1080 rows by 1920 columns), such as 4K (the number of pixels is about 2000 rows by about 4000 columns) or 8K (the number of pixels is about 4000 rows by about 8000 columns), for example, there are cases where flicker is not observed and there is substantially no problem in terms of the display quality even if the polarity is inverted every two or more rows. In view of suppressing flicker, N in N-row, one-column dot inversion state is preferably an integer that is less than or equal to twice the quotient obtained by dividing m by 1080, for example, where m is the number of rows formed by a plurality of pixels that define the display region 10d.

Embodiment 2

Figure 5:
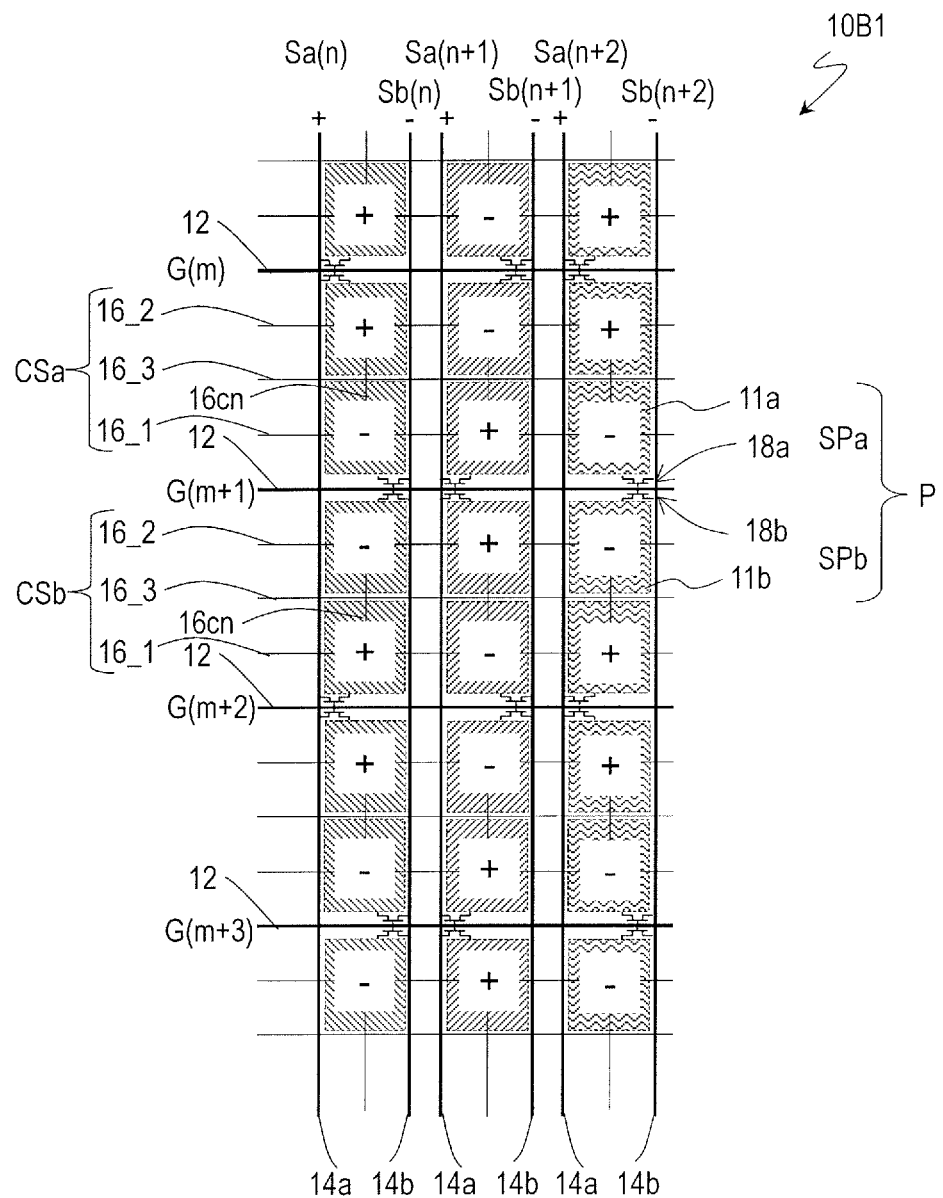
FIG. 5 A schematic plan view of a TFT substrate 10B1 used in a liquid crystal display panel according to Embodiment 2 of the present invention.
Figure 6:
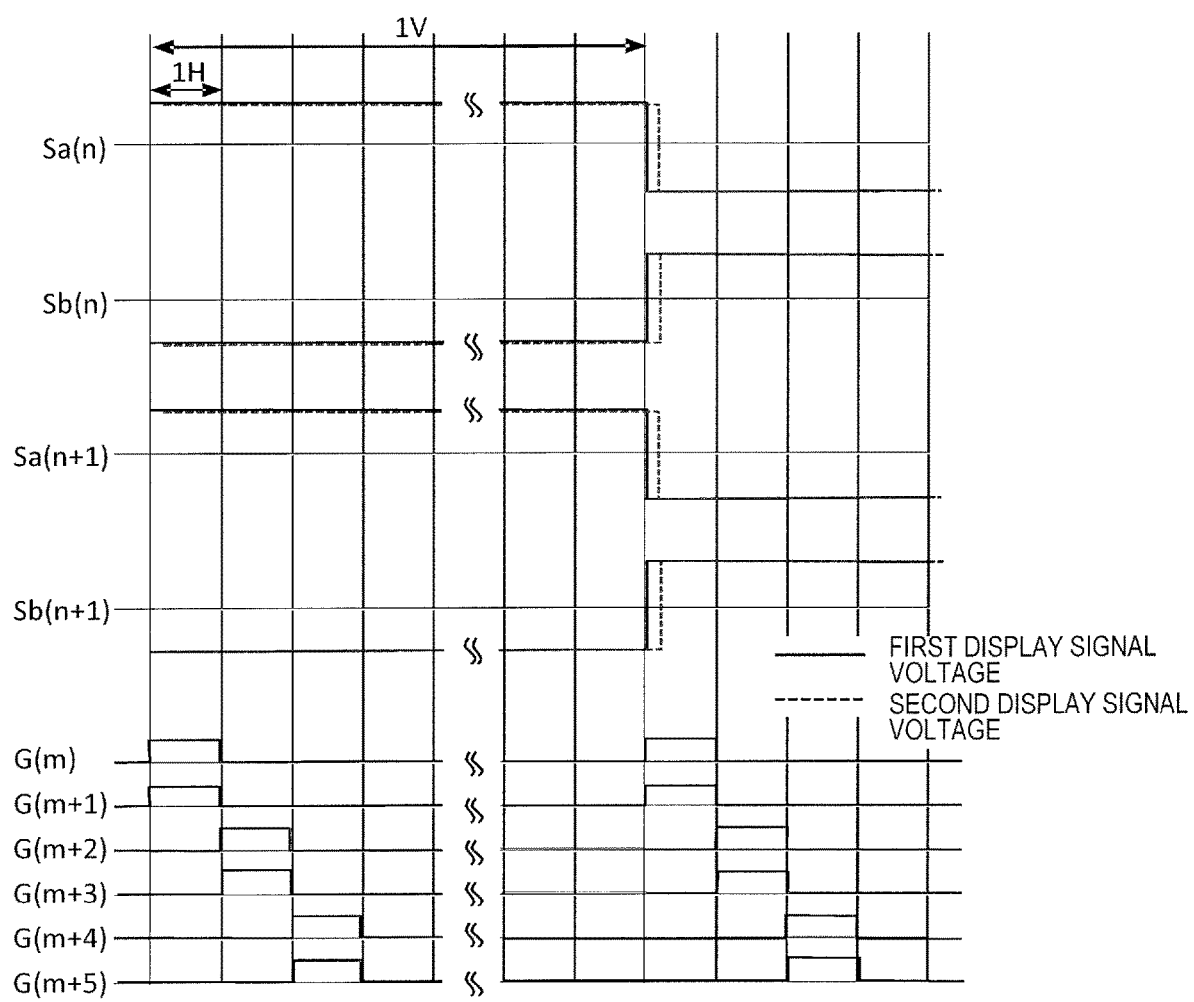
FIG. 6 A diagram showing waveforms of various voltages used for driving a liquid crystal display panel having the TFT substrate 10B1.

Referring to FIG. 5 and FIG. 6, a liquid crystal display panel according to Embodiment 2 of the present invention will be described. FIG. 5 is a schematic plan view of the TFT substrate 10B1 used in the liquid crystal display panel according to Embodiment 2 of the present invention, and FIG. 6 is a diagram showing waveforms of various voltages used for driving the liquid crystal display panel having the TFT substrate 10B1. The following description will focus on differences between the liquid crystal display panel according to the present embodiment and the liquid crystal display panel of Embodiment 1. This similarly applies also to the subsequent embodiments.

The liquid crystal display panel according to Embodiment 2 is different from the liquid crystal display panel according to Embodiment 1 in that it has a double-source structure.

FIG. 5 is a diagram showing the electric connections between the transistors of the pixels and the gate bus lines 12 and source bus lines 14a and 14b, and the polarities of the display signal voltages applied to pixels during a vertical scanning period. In the liquid crystal display panel according to Embodiment 2, the plurality of source bus lines include first source bus lines 14a and second source bus lines 14b arranged corresponding to pixel columns. In the figure, each source bus line provided on the left side of pixels is denoted as a first source bus line 14a, and each source bus line provided on the right side of pixels is denoted as a second source bus line 14b. A first source bus line arranged corresponding to the $n^{th}$ pixel column (i.e., a plurality of pixels arranged in a column direction) may be denoted as Sa(n) and a second source bus line arranged corresponding to the $n^{th}$ pixel column may be denoted as Sb(n).

As shown in FIG. 5, the polarities of the first display signal voltages supplied to the first source bus line 14a and the second source bus line 14b in each vertical scanning period are opposite to each other, and the polarities of the second display signal voltages supplied thereto in each vertical scanning period are opposite to each other. The polarities of the first display signal voltages supplied to two pixels adjacent to each other in the row direction in each vertical scanning period are opposite to each other, and the polarities of the second display signal voltages supplied to two pixels adjacent to each other in the row direction in each vertical scanning period are opposite to each other. In each pixel row, one of two pixels adjacent to each other in the row direction is connected to the first source bus line 14a and the other pixel is connected to the second source bus line 14b.

As shown in FIG. 6, with the liquid crystal display panel having the TFT substrate 10B1, the polarities of the first display signal voltage and the second display signal voltage, which are supplied to each source bus line 14a, 14b while being superposed on each other, do not change within each vertical scanning period. As shown in FIG. 5, the polarities of the signal voltages supplied to pixels adjacent to each other are opposite to each other in each vertical scanning period, exhibiting a dot inversion state.

With the liquid crystal display panel having the TFT substrate 10B1, the frequency with which the polarities of the first display signal voltage and the second display signal voltage, which are supplied to each source bus line 14a, 14b, are different from each other is lower than that with the liquid crystal display panel of Comparative Example 1, thereby suppressing the heat generation of source drivers.

Since the liquid crystal display panel having the TFT substrate 10B1 can suppress the occurrence of flicker, it is possible to suppress the heat generation of source drivers without lowering the display quality.

FIG. 6 shows waveforms of voltages supplied to first source bus lines Sa(n), second source bus lines Sb(n) and gate bus lines G(m). Among the display signal voltages supplied to the source bus lines Sa(n) and Sb(n), the first display signal voltage is shown by a solid line and the second display signal voltage by a broken line. The first display signal voltage and the second display signal voltage supplied to the source bus lines Sa(n), Sb(n) each have its polarity inverted every vertical scanning period (1V), for example.

Since the liquid crystal display panel having the TFT substrate 10B1 has a double-source structure, it is possible to simultaneously select two gate bus lines as shown in FIG. 6. For example, as shown in FIG. 6, the transistors connected to two pixels adjacent to each other in the column direction are ON at the same time. For example, the transistors connected to two pixels adjacent to each other in the column direction are connected to different gate bus lines G(m) and G(m+1) from each other, and the gate bus lines G(m) and G(m+1) are selected simultaneously. Transistors that are connected to two pixels adjacent to each other in the column direction may be turned ON/OFF in accordance with a common scanning signal.

Since the liquid crystal display panel having the TFT substrate 10B1 has a two-side input driving structure, the charging ability that is required for each source driver is reduced as compared with a liquid crystal display panel having a one-side input driving structure. That is, a liquid crystal display panel having the TFT substrate 10B1 has a high charging ability, as compared with a liquid crystal display panel having a one-side input driving structure. The charging ability of the liquid crystal display panel having the TFT substrate 10B1 is evaluated below.

With a liquid crystal display panel having the TFT substrate 10B1 driven by selecting two gate bus lines simultaneously, a sufficient amount of time is ensured for charging pixels. The charging time per pixel is twice that of the liquid crystal display panel according to Embodiment 1 having a single-source structure. The source bus line load per source driver is equal to that of the liquid crystal display panel according to Embodiment 1 having a single-source structure. Herein, taking into consideration the influence of parasitic capacitance due to the transistors connected to the source bus lines, the source bus line load per source driver is smaller than that of the liquid crystal display panel according to Embodiment 1. This is because the number of transistors connected to each source bus line for the liquid crystal display panel of Embodiment 2 having a double-source structure is a half that for the liquid crystal display panel of Embodiment 1 having a single-source structure.

Thus, where the charging ability of the liquid crystal display panel according to Embodiment 1 having a single-source structure and a two-side input driving structure is one, the charging ability of the liquid crystal display panel according to Embodiment 2 having a double-source structure and a two-side input driving structure is two or more. The charging ability of the liquid crystal display panel according to Embodiment 2 can be evaluated to be at least eight times that of the liquid crystal display panel of Comparative Example 2 having a single-source structure and a one-side input driving structure.

While the liquid crystal display panel according to Embodiment 2 has a multi-pixel structure in the example described above, the present embodiment is not limited thereto.

As described above in Embodiment 1, the multi-pixel structure and/or the multi-pixel driving method of the liquid crystal display panel of the present embodiment are not limited to those illustrated herein. That is, the method for exhibiting different grayscale levels (brightnesses) from each other on two sub-pixels of each pixel is not limited to the method illustrated herein. The liquid crystal display panel of the present embodiment does not need to have a multi-pixel structure. The liquid crystal display panel of the present embodiment does not need to perform multi-pixel driving. The liquid crystal display panel of the present embodiment is not limited to the vertical alignment mode (VA mode). The liquid crystal display panel of the present embodiment may be of a transverse electric field mode (including the IPS mode and the FFS mode).

While the liquid crystal display panel having the TFT substrate 10B1 exhibits a dot inversion state (one-row, one-column dot inversion state) in the example described above, the present embodiment is not limited thereto. As will be shown below, the liquid crystal display panel according to the present embodiment may exhibit an N-row, one-column dot inversion state (N is an integer greater than or equal to two). A case where N=2 will be described with reference to FIG. 7, and a case where N is greater than or equal to three will be described with reference to FIG. 8.

Figure 7:
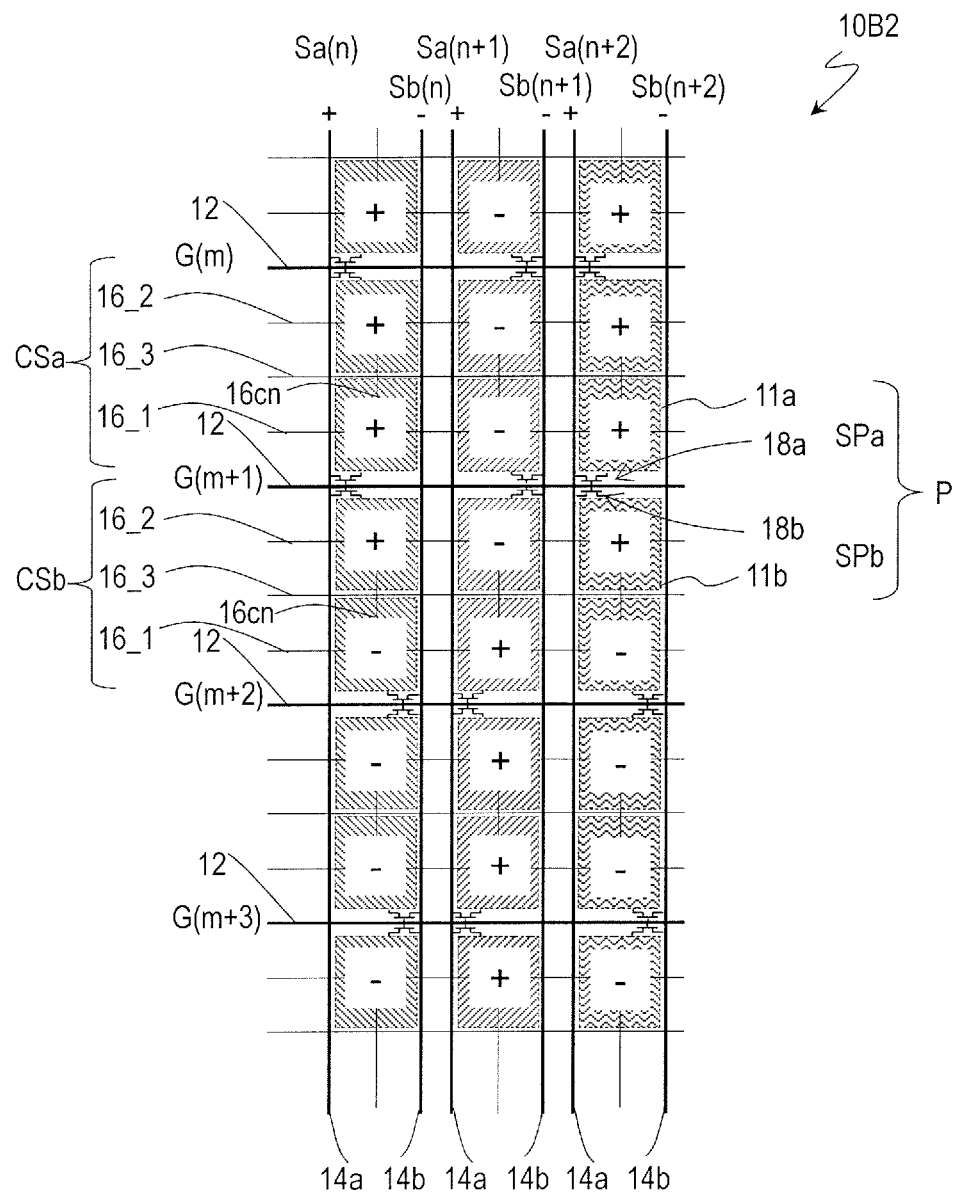
FIG. 7 A schematic plan view of a TFT substrate 10B2 used in a liquid crystal display panel according to Embodiment 2 of the present invention.

Referring to FIG. 7, another example of the present embodiment will be described. FIG. 7 is a schematic plan view of the TFT substrate 10B2 used in the liquid crystal display panel according to Embodiment 2, showing the electric connections between the transistors of the pixels and the gate bus lines 12 and the source bus lines 14a and 14b, and the polarities of the display signal voltages applied to pixels during a vertical scanning period.

As shown in FIG. 7, the liquid crystal display panel having the TFT substrate 10B2 is different from a liquid crystal display panel having the TFT substrate 10B1 in that it exhibits a two-row, one-column dot inversion state. That is, for each pixel column (which is assumed to be the $n^{th}$ pixel column.) of the TFT substrate 10B2, the transistors 18a and 18b connected to two pixels adjacent to each other are connected to the first source bus line 14a arranged corresponding to that pixel column (the $n^{th}$ pixel column), and the transistors 18a and 18b connected to two pixels adjacent to each other that are adjacent in the column direction to the above-mentioned two pixels are connected to the second source bus line 14b arranged corresponding to that pixel column (the $n^{th}$ pixel column). The liquid crystal display panel having the TFT substrate 10B2 may be the same as the liquid crystal display panel having the TFT substrate 10B1 except for electric connections between the transistors of the pixels and the source bus lines. The various voltages used for driving the liquid crystal display panel having the TFT substrate 10B2 may be the same as the various voltages shown in FIG. 6 used for driving the liquid crystal display panel having the TFT substrate 10B1.

Since the liquid crystal display panel having the TFT substrate 10B2 has a two-side input driving structure, the charging ability that is required for each source driver is reduced as compared with a liquid crystal display panel having a one-side input driving structure.

With the liquid crystal display panel having the TFT substrate 10B2, the polarities of the first display signal voltage and the second display signal voltage, which are supplied to each source bus line 14a, 14b while being superposed on each other, do not change within each vertical scanning period. With the liquid crystal display panel having the TFT substrate 10B2, the frequency with which the polarities of the first display signal voltage and the second display signal voltage, which are supplied to each source bus line 14a, 14b, are different from each other is lower than that with the liquid crystal display panel of Comparative Example 1, thereby suppressing the heat generation of source drivers.

Since the liquid crystal display panel having the TFT substrate 10B2 exhibits a two-row, one-column dot inversion state in each vertical scanning period, flicker is suppressed. Note however that with the resolution being equal, a one-row, one-column dot inversion state is more preferred than a two-row, one-column dot inversion state in view of suppressing the occurrence of flicker.

Figure 8:
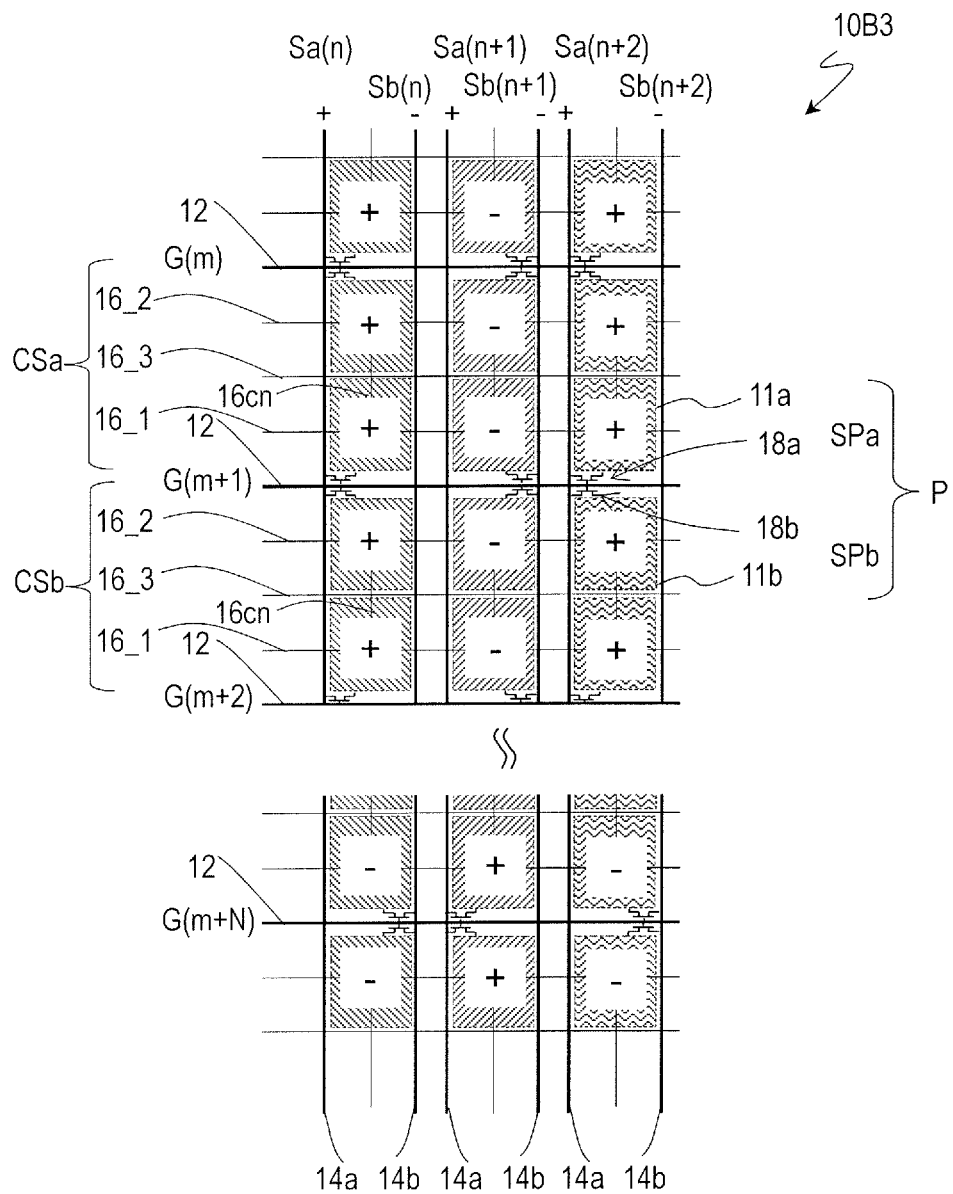
FIG. 8 A schematic plan view of a TFT substrate 10B3 used in a liquid crystal display panel according to Embodiment 2 of the present invention.

Referring to FIG. 8, still another example of the present embodiment will be described. FIG. 8 is a schematic plan view of the TFT substrate 10B3 used in the liquid crystal display panel according to Embodiment 2, showing the electric connections between the transistors of the pixels and the gate bus lines 12 and the source bus lines 14a and 14b, and the polarities of the display signal voltages applied to pixels during a vertical scanning period.

As shown in FIG. 8, the liquid crystal display panel having the TFT substrate 10B3 is different from the liquid crystal display panel having the TFT substrate 10B1 in that it exhibits an N-row, one-column dot inversion state (N is an integer greater than or equal to three). That is, for each pixel column (which is assumed to be the $n^{th}$ pixel column.) of the TFT substrate 10B3, the transistors 18a and 18b connected to N pixels adjacent to each other are connected to the first source bus line 14a arranged corresponding to that pixel column (the n$^{th}$ pixel column), and the transistors 18a and 18b connected to N pixels adjacent to each other that are adjacent in the column direction to the above-mentioned N pixels are connected to the second source bus line 14b arranged corresponding to that pixel column (the n$^{th}$ pixel column). The liquid crystal display panel having the TFT substrate 10B3 may be the same as the liquid crystal display panel having the TFT substrate 10B1 except for electric connections between the transistors of the pixels and the source bus lines. The various voltages used for driving the liquid crystal display panel having the TFT substrate 10B3 may be the same as the various voltages shown in FIG. 6 used for driving the liquid crystal display panel having the TFT substrate 10B1.

Since the liquid crystal display panel having the TFT substrate 10B3 has a two-side input driving structure, the charging ability that is required for each source driver is reduced as compared with a liquid crystal display panel having a one-side input driving structure.

With the liquid crystal display panel having the TFT substrate 10B3, the polarities of the first display signal voltage and the second display signal voltage, which are supplied to each source bus line 14a, 14b while being superposed on each other, do not change within each vertical scanning period. With the liquid crystal display panel having the TFT substrate 10B3, the frequency with which the polarities of the first display signal voltage and the second display signal voltage, which are supplied to each source bus line 14a, 14b, are different from each other is lower than that with the liquid crystal display panel of Comparative Example 1, thereby suppressing the heat generation of source drivers.

Since the liquid crystal display panel having the TFT substrate 10B3 exhibits an N-row, one-column dot inversion state in each vertical scanning period, flicker is suppressed. With the resolution being equal, a one-row, one-column dot inversion state is more preferred than an N-row, one-column dot inversion state in view of suppressing the occurrence of flicker. However, with high-definition display panels having resolutions exceeding FHD (the number of pixels is 1080 rows by 1920 columns), such as 4K (the number of pixels is about 2000 rows by about 4000 columns) or 8K (the number of pixels is about 4000 rows by about 8000 columns), for example, there are cases where flicker is not observed and there is substantially no problem in terms of the display quality even if the polarity is inverted every two or more rows. In view of suppressing flicker, N in N-row, one-column dot inversion state is preferably an integer that is less than or equal to twice the quotient obtained by dividing m by 1080, for example, where m is the number of rows formed by a plurality of pixels that define the display region 10d.

Embodiment 3

Figure 9:
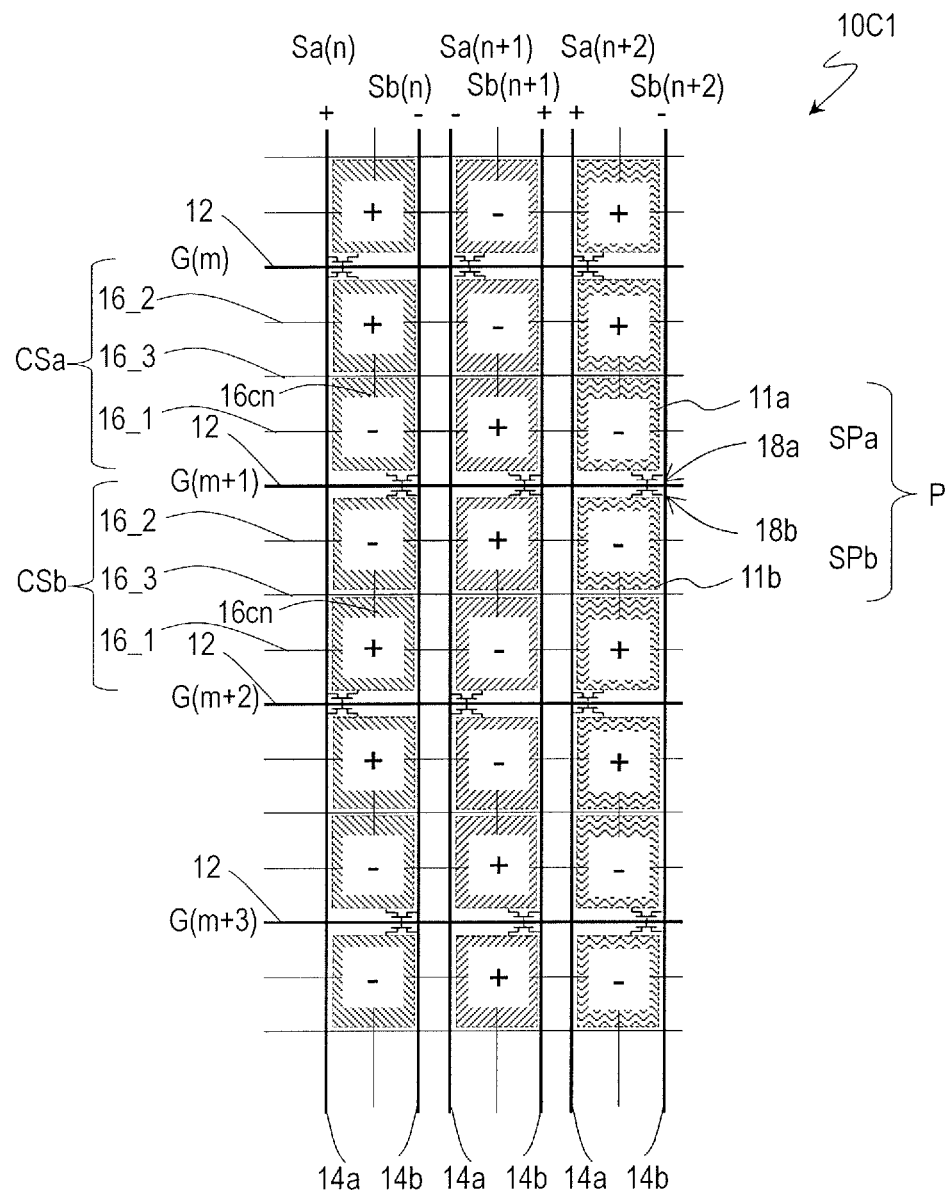
FIG. 9 A schematic plan view of a TFT substrate 10C1 used in a liquid crystal display panel according to Embodiment 3 of the present invention.
Figure 10:
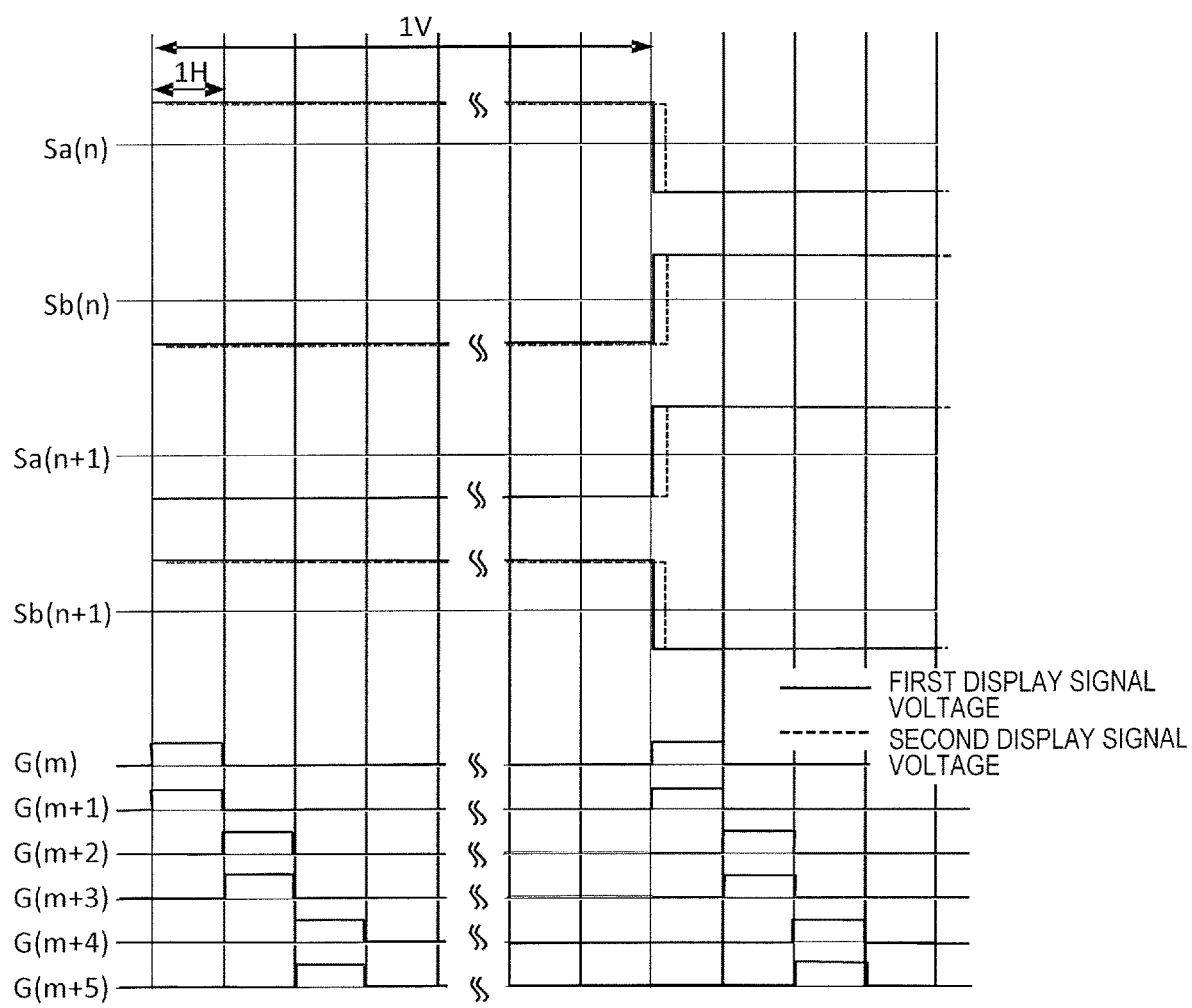
FIG. 10 A diagram showing waveforms of various voltages used for driving a liquid crystal display panel having the TFT substrate 10C1.

Referring to FIG. 9 and FIG. 10, a liquid crystal display panel according to Embodiment 3 of the present invention will be described. FIG. 9 is a schematic plan view of the TFT substrate 10C1 used in the liquid crystal display panel according to Embodiment 3 of the present invention, and FIG. 10 is a diagram showing waveforms of various voltages used for driving the liquid crystal display panel having the TFT substrate 10C1.

The liquid crystal display panel according to Embodiment 3 has a double-source structure as does the liquid crystal display panel according to Embodiment 2, but it is different from the liquid crystal display panel according to Embodiment 2 in terms of the electric connections between the transistors of the pixels and the source bus lines 14a and 14b, and the polarities of the display signal voltages applied to each source bus line 14a, 14b in each vertical scanning period.

FIG. 9 is a diagram showing the electric connections between the transistors of the pixels and the gate bus lines 12 and the source bus lines 14a and 14b, and the polarities of the display signal voltages applied to pixels during a vertical scanning period. As shown in FIG. 9, in each pixel row, two pixels adjacent to each other in the row direction are both connected to the first source bus line 14a or the second source bus line 14b. The first display signal voltages supplied to two first source bus lines Sa(n) and Sa(n+1) that are associated with two pixel columns adjacent to each other are opposite to each other in each vertical scanning period, and the first display signal voltages supplied to two second source bus lines Sb(n) and Sb(n+1) that are associated with two pixel columns adjacent to each other are opposite to each other in each vertical scanning period. The second display signal voltages supplied to two first source bus lines Sa(n) and Sa(n+1) that are associated with two pixel columns adjacent to each other are opposite to each other in each vertical scanning period, and the second display signal voltages supplied to two second source bus lines Sb(n) and Sb(n+1) that are associated with two pixel columns adjacent to each other are opposite to each other in each vertical scanning period.

As shown in FIG. 10, with the liquid crystal display panel having the TFT substrate 10C1, the polarities of the first display signal voltage and the second display signal voltage, which are supplied to each source bus line 14a, 14b while being superposed on each other do not change within each vertical scanning period. As shown in FIG. 9, the polarities of the signal voltages supplied to pixels adjacent to each other are opposite to each other in each vertical scanning period, exhibiting a dot inversion state.

With the liquid crystal display panel having the TFT substrate 10C1, the frequency with which the polarities of the first display signal voltage and the second display signal voltage, which are supplied to each source bus line 14a, 14b, are different from each other is lower than that with the liquid crystal display panel of Comparative Example 1, thereby suppressing the heat generation of source drivers.

Since the liquid crystal display panel having the TFT substrate 10C1 can suppress the occurrence of flicker, it is possible to suppress the heat generation of source drivers without lowering the display quality.

Since the liquid crystal display panel having the TFT substrate 10C1 has a two-side input driving structure, the charging ability that is required for each source driver is reduced as compared with a liquid crystal display panel having a one-side input driving structure. That is, a liquid crystal display panel having the TFT substrate 10C1 has a high charging ability, as compared with a liquid crystal display panel having a one-side input driving structure.

FIG. 10 shows waveforms of voltages supplied to first source bus lines Sa(n), second source bus lines Sb(n) and gate bus lines G(m). Among the display signal voltages supplied to the source bus lines Sa(n) and Sb(n), the first display signal voltage is shown by a solid line and the second display signal voltage by a broken line. As shown in FIG. 9, the first display signal voltage and the second display signal voltage supplied to each source bus line Sa(n), Sb(n) each have its polarity inverted every vertical scanning period (1V).

While the liquid crystal display panel having the TFT substrate 10C1 exhibits a dot inversion state (one-row, one-column dot inversion state) in the example described above, the present embodiment is not limited thereto. As will be shown below, the liquid crystal display panel according to the present embodiment may exhibit an N-row, one-column dot inversion state (N is an integer greater than or equal to two). A case where N=2 will be described with reference to FIG. 11, and a case where N is greater than or equal to three will be described with reference to FIG. 12.

Figure 11:
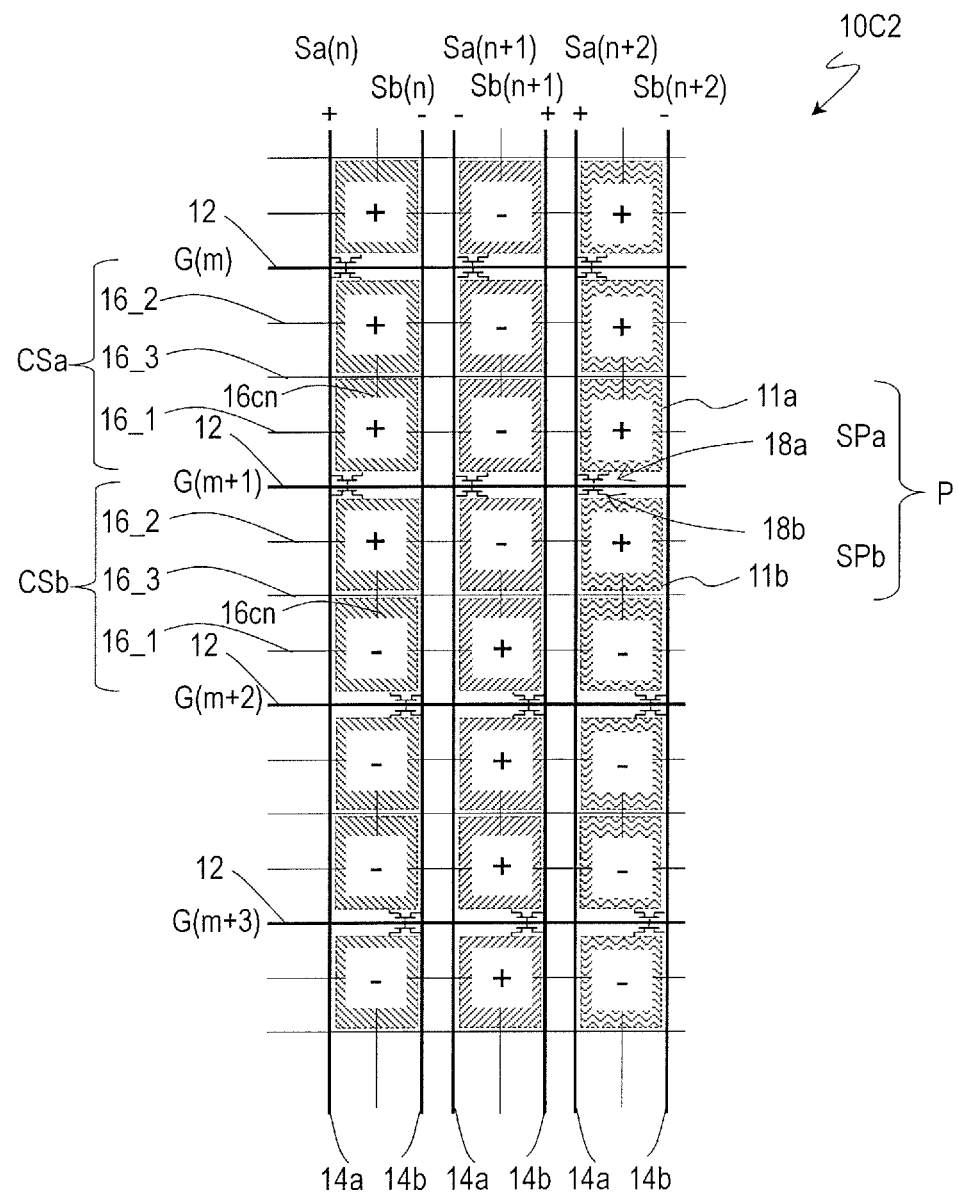
FIG. 11 A schematic plan view of a TFT substrate 10C2 used in a liquid crystal display panel according to Embodiment 3 of the present invention.

Referring to FIG. 11, another example of the present embodiment will be described. FIG. 11 is a schematic plan view of the TFT substrate 10C2 used in the liquid crystal display panel according to Embodiment 3, showing the electric connections between the transistors of the pixels and the gate bus line 12 and the source bus lines 14a and 14b, and the polarities of the display signal voltages applied to pixels during a vertical scanning period.

As shown in FIG. 11, the liquid crystal display panel having the TFT substrate 10C2 is different from a liquid crystal display panel having the TFT substrate 10C1 in that it exhibits a two-row, one-column dot inversion state. That is, for each pixel column (which is assumed to be the $n^{th}$ pixel column.) of the TFT substrate 10C2, the transistors 18a and 18b connected to two pixels adjacent to each other are connected to the first source bus line 14a arranged corresponding to that pixel column (the $n^{th}$ pixel column), and the transistors 18a and 18b connected to two pixels adjacent to each other that are adjacent in the column direction to the above-mentioned two pixels are connected to the second source bus line 14b arranged corresponding to that pixel column (the $n^{th}$ pixel column).

The liquid crystal display panel having the TFT substrate 10C2 may be the same as the liquid crystal display panel having the TFT substrate 10C1 except for electric connections between the transistors of the pixels and the source bus lines. The various voltages used for driving the liquid crystal display panel having the TFT substrate 10C2 may be the same as the various voltages shown in FIG. 10 used for driving the liquid crystal display panel having the TFT substrate 10C1.

Since the liquid crystal display panel having the TFT substrate 10C2 has a two-side input driving structure, the charging ability that is required for each source driver is reduced as compared with a liquid crystal display panel having a one-side input driving structure.

With the liquid crystal display panel having the TFT substrate 10C2, the polarities of the first display signal voltage and the second display signal voltage, which are supplied to each source bus line 14a, 14b while being superposed on each other, do not change within each vertical scanning period. With the liquid crystal display panel having the TFT substrate 10C2, the frequency with which the polarities of the first display signal voltage and the second display signal voltage, which are supplied to each source bus line 14a, 14b, are different from each other is lower than that with the liquid crystal display panel of Comparative Example 1, thereby suppressing the heat generation of source drivers.

Since the liquid crystal display panel having the TFT substrate 10C2 exhibits a two-row, one-column dot inversion state in each vertical scanning period, flicker is suppressed. Note however that with the resolution being equal, a one-row, one-column dot inversion state is more preferred than a two-row, one-column dot inversion state in view of suppressing the occurrence of flicker.

Figure 12:
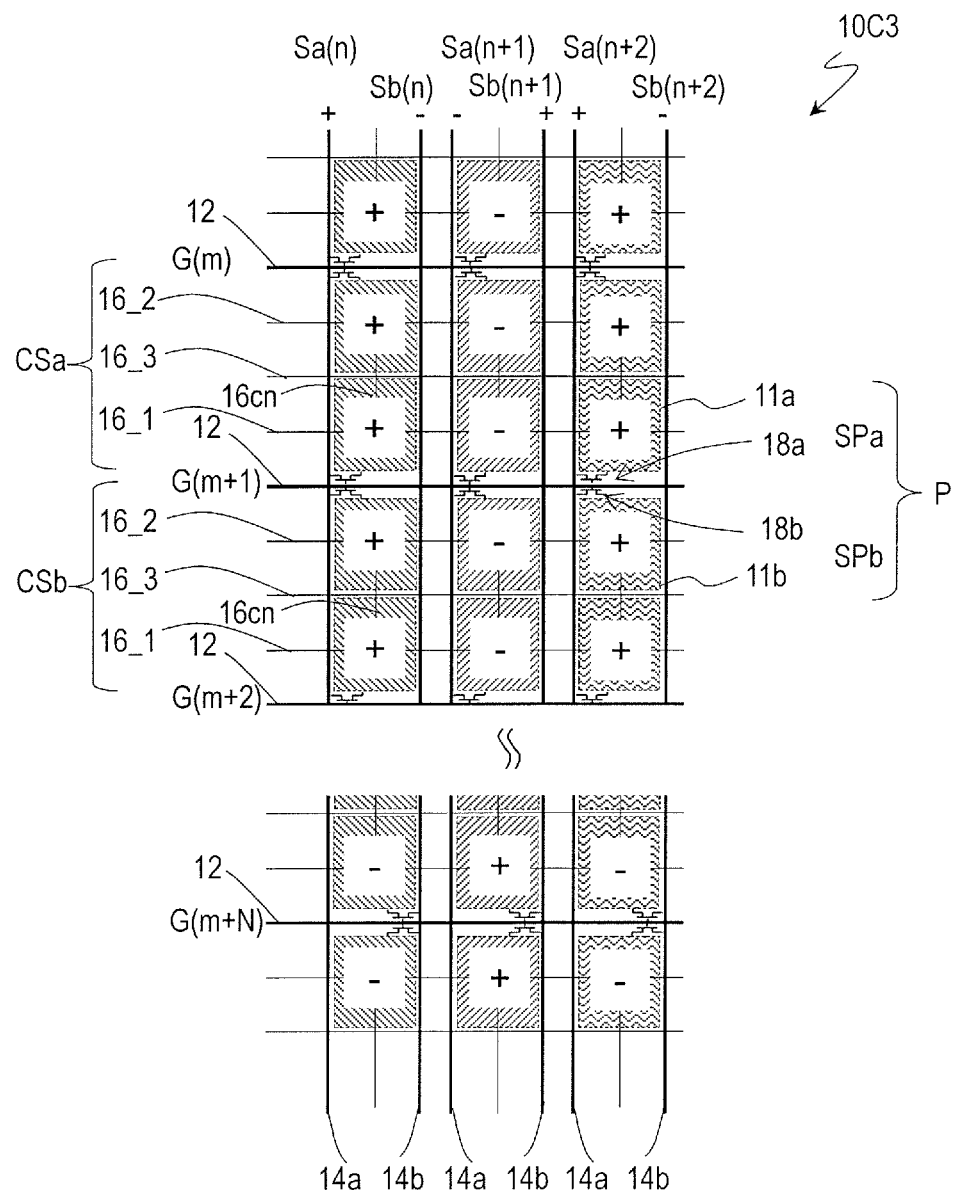
FIG. 12 A schematic plan view of a TFT substrate 10C3 used in a liquid crystal display panel according to Embodiment 3 of the present invention.

Referring to FIG. 12, still another example of the present embodiment will be described. FIG. 12 is a schematic plan view of the TFT substrate 10C3 used in the liquid crystal display panel according to Embodiment 3, showing the electric connections between the transistors of the pixels and the gate bus lines 12 and the source bus lines 14a and 14b, and the polarities of the display signal voltages applied to pixels during a vertical scanning period.

As shown in FIG. 12, the liquid crystal display panel having the TFT substrate 10C3 is different from the liquid crystal display panel having the TFT substrate 10C1 in that it exhibits an N-row, one-column dot inversion state (N is an integer greater than or equal to three). That is, for each pixel column (which is assumed to be the $n^{th}$ pixel column.) of the TFT substrate 10B3, the transistors 18a and 18b connected to N pixels adjacent to each other are connected to the first source bus line 14a arranged corresponding to that pixel column (the $n^{th}$ pixel column), and the transistors 18a and 18b connected to N pixels adjacent to each other that are adjacent in the column direction to the above-mentioned N pixels are connected to the second source bus line 14b arranged corresponding to that pixel column (the $n^{th}$ pixel column). The liquid crystal display panel having the TFT substrate 10C3 may be the same as the liquid crystal display panel having the TFT substrate 10C1 except for electric connections between the transistors of the pixels and the source bus lines. The various voltages used for driving the liquid crystal display panel having the TFT substrate 10C3 may be the same as the various voltages shown in FIG. 10 used for driving the liquid crystal display panel having the TFT substrate 10C1.

Since the liquid crystal display panel having the TFT substrate 10C3 has a two-side input driving structure, the charging ability that is required for each source driver is reduced as compared with a liquid crystal display panel having a one-side input driving structure.

With the liquid crystal display panel having the TFT substrate 10C3, the polarities of the first display signal voltage and the second display signal voltage, which are supplied to each source bus line 14a, 14b while being superposed on each other, do not change within each vertical scanning period. With the liquid crystal display panel having the TFT substrate 10C3, the frequency with which the polarities of the first display signal voltage and the second display signal voltage, which are supplied to each source bus line 14a, 14b, are different from each other is lower than that with the liquid crystal display panel of Comparative Example 1, thereby suppressing the heat generation of source drivers.

Since the liquid crystal display panel having the TFT substrate 10C3 exhibits an N-row, one-column dot inversion state in each vertical scanning period, flicker is suppressed. With the resolution being equal, a one-row, one-column dot inversion state is more preferred than an N-row, one-column dot inversion state in view of suppressing the occurrence of flicker. However, with high-definition display panels having resolutions exceeding FHD (the number of pixels is 1080 rows by 1920 columns), such as 4K (the number of pixels is about 2000 rows by about 4000 columns) or 8K (the number of pixels is about 4000 rows by about 8000 columns), for example, there are cases where flicker is not observed and there is substantially no problem in terms of the display quality even if the polarity is inverted every two or more rows. In view of suppressing flicker, N in N-row, one-column dot inversion state is preferably an integer that is less than or equal to twice the quotient obtained by dividing m by 1080, for example, where m is the number of rows formed by a plurality of pixels that define the display region 10d.

Embodiment 4

Figure 13:
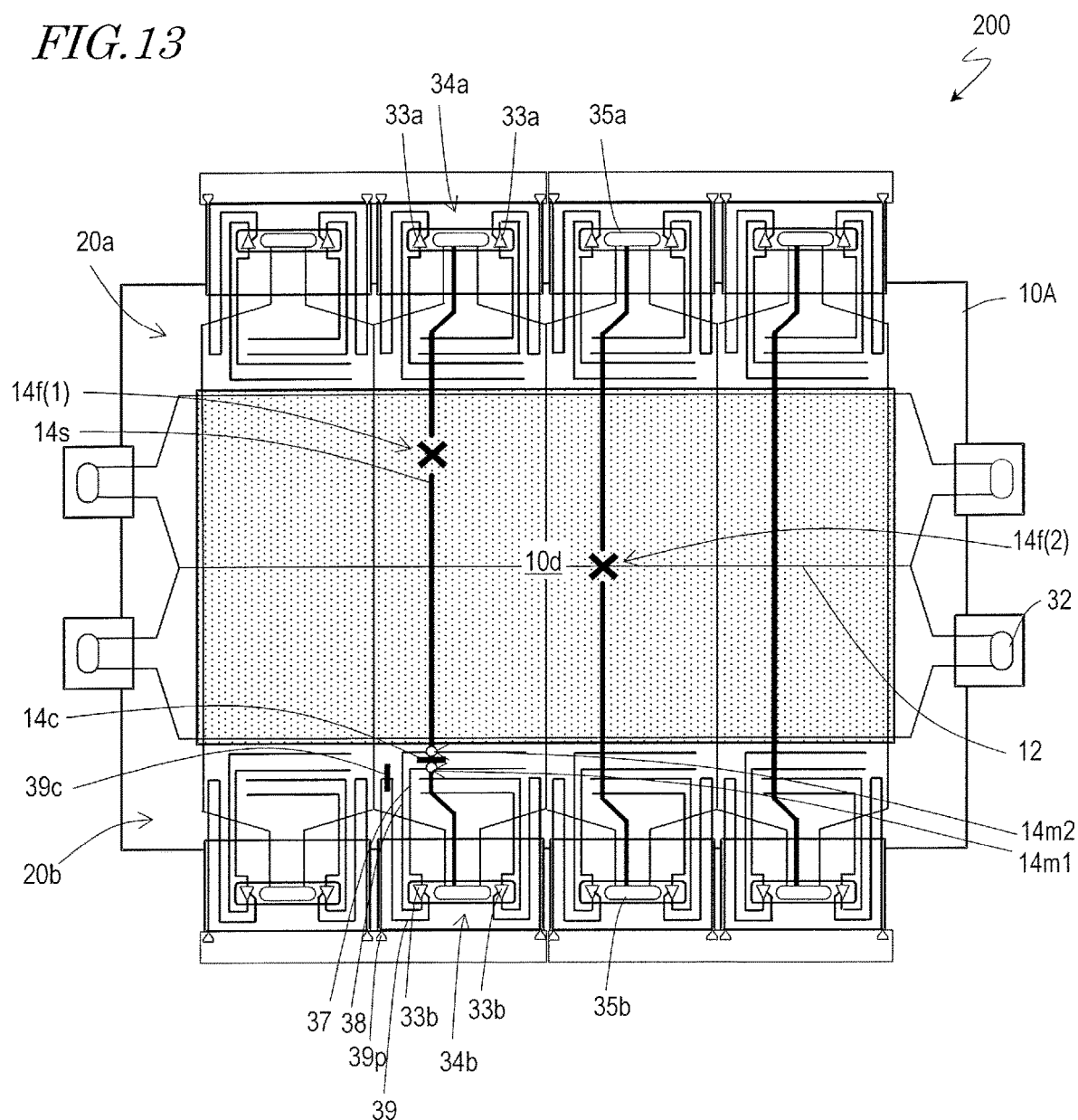
FIG. 13 A schematic plan view of a liquid crystal display panel 200 according to Embodiment 4 of the present invention.

Referring to FIG. 13, a liquid crystal display panel 200 according to Embodiment 4 of the present invention, and a repair method therefor will be described. FIG. 13 is a schematic plan view of the liquid crystal display panel 200 according to Embodiment 4 of the present invention. With the liquid crystal display panel according to Embodiment 4, it is possible to solve Problem 1 (the problem of the source driver heating up excessively) as well as the problem that a dark area occurs in the display region when a break occurs in a source bus line (Problem 2).

As shown in FIG. 13, the liquid crystal display panel 200 further includes a plurality of first buffer circuits 34a provided in the first frame region 20a, and a plurality of second buffer circuits 34b provided in the second frame region 20b. Each of the plurality of first buffer circuits 34a is provided corresponding to one of the plurality of first source drivers 35a and a plurality of source bus lines that are associated with the one of the plurality of first source drivers 35a. Each of the plurality of first buffer circuits 34a includes a plurality of first buffers 33a. Each of the plurality of second buffer circuits 34b is provided corresponding to one of the plurality of second source drivers 35b and a plurality of source bus lines that are associated with the one of the plurality of second source drivers 35b. Each of the plurality of second buffer circuits 34b includes a plurality of second buffers 33b.

A first buffer circuit 34a being provided so as to correspond to one of the plurality of first source drivers 35a and to a plurality of source bus lines that are associated with the one of the plurality of first source drivers 35a means that the first buffer circuit 34a is provided so that the input line and the output line thereof can be electrically connected to an arbitrarily selected one of the associated source bus lines. A second buffer circuit 34b being provided so as to correspond to one of the plurality of second source drivers 35b and to a plurality of source bus lines that are associated with the one of the plurality of second source drivers 35b means that the second buffer circuit 34b is provided so that the input line and the output line thereof can be electrically connected to an arbitrarily selected one of the associated source bus lines.

The liquid crystal display panel 200 is different from the liquid crystal display panel according to any one of Embodiments 1 to 3 described above in that it further includes the first buffer circuits 34a and the second buffer circuits 34b. For example, while the liquid crystal display panel 200 has a single-source structure, the liquid crystal display panel of the present embodiment is not limited thereto, but may have a double-source structure. The first buffer circuits 34a and the second buffer circuits 34b may be referred to collectively as buffer circuits, and the first buffers and the second buffers may be referred to collectively as buffers (buffer amplifiers).

As described in Patent Document No. 1, supra, with a liquid crystal display panel having a two-side input driving structure, since display signal voltages are supplied from both sides (e.g., the upper side and the lower side) of the source bus lines, a display signal voltage can be supplied to every pixel even if a break occurs in a source bus line. However, according to a study by the present inventors, when a break occurred in a source bus line in a liquid crystal display panel having a two-side input driving structure, a dark area occurred in some cases in the display region of the liquid crystal display panel. This was because on the source bus line 14s in which a break 14f had occurred, the oscillation waveform for the display signal voltage got blunted that was supplied to a longer one of the distance from the location of the break 14f to the first source driver 35a and the distance from the location of the break 14f to the second source driver 35b. That is, if the distance is long, the RC time constant (the product of capacitance and resistance) of the source bus line is large, which may lead to blunting of the oscillation waveform of the display signal voltage. The occurrence of a dark area in the display region was significant with high-definition and/or large-size liquid crystal display panels, for example. This is because the charging ability that is required for each source driver increases with high-definition and/or large-size liquid crystal display panels.

With the liquid crystal display panel 200 according to Embodiment 4, one of the outputs to a source bus line in which a break has occurred that is from one of the source drivers that is farther away from the location of the break is output through a buffer circuit, and it is therefore possible to compensate for the voltage drop. With the liquid crystal display panel 200 or a repair method using the liquid crystal display panel 200, it is possible to prevent the occurrence of a dark area in the display region even if a break occurs in a source bus line.

With the liquid crystal display panel 200, when the break 14f occurs in one of the plurality of source bus lines 14s, and the distance from the location of the break 14f to the first source driver 35a is longer than the distance from the location of the break 14f to the second source driver 35b, the source bus line 14s where the break 14f has occurred is connected to one of the plurality of first buffers 33a. When the break 14f occurs in one of the plurality of source bus lines 14s, and the distance from the location of the break 14f to the second source driver 35b is longer than the distance from the location of the break 14f to the first source driver 35a, the source bus line 14s where the break 14f has occurred is connected to one of the plurality of second buffers 33b.

For example, as shown in FIG. 13, along a source bus line 14s where a break 14f(1) has occurred, the second source driver 35b, between the first and second source drivers 35a and 35b that are connected to the source bus line 14s, has a longer distance from the location of the break 14f(1). Thus, the source bus line 14s where the break 14f(1) has occurred is connected to the second buffer 33b.

The source bus line 14s where the break 14f(1) has occurred is connected to the second buffer 33b as follows, for example. The source bus line 14s where the break 14f(1) has occurred is cut off at a cut-off point 14c. For example, the second buffer circuit 34b includes the second buffer 33b, an input line 37 and an output line 38. The source bus line 14s where the break 14f(1) has occurred and the input line 37 are connected to each other via a connection point 14m1 that is formed by melting the intersection therebetween. The source bus line 14s where the break 14f(1) has occurred and the output line 38 are connected to each other via a connection point 14m2 that is formed by melting the intersection therebetween. The cut-off point 14c and the connection points 14m1 and 14m2 are formed by using a laser repair device known in the art, for example.

As shown in FIG. 13, along the source bus line 14s where the break 14f(2) has occurred, the distance from the location of the break 14f(2) to the first source driver 35a is equal to the distance from the location of the break 14f(2) to the second source driver 35b. In such a case, neither one of the first buffer 33a and the second buffer 33b may be used. This is because for the source bus line 14s where the break 14f(2) has occurred, the source bus line RC time constant of the first source driver 35a is equal to the source bus line RC time constant of the second source driver 35b. Note however that when checking the display of the liquid crystal display panel 200, for example, one may arbitrarily select one of the first buffer 33a and the second buffer 33b and connect the buffer to the source bus line 14s where the break 14f(2) has occurred, or may connect both of the first buffer 33a and the second buffer 33b to the source bus line 14s where the break 14f(2) has occurred, as necessary.

Figure 14:
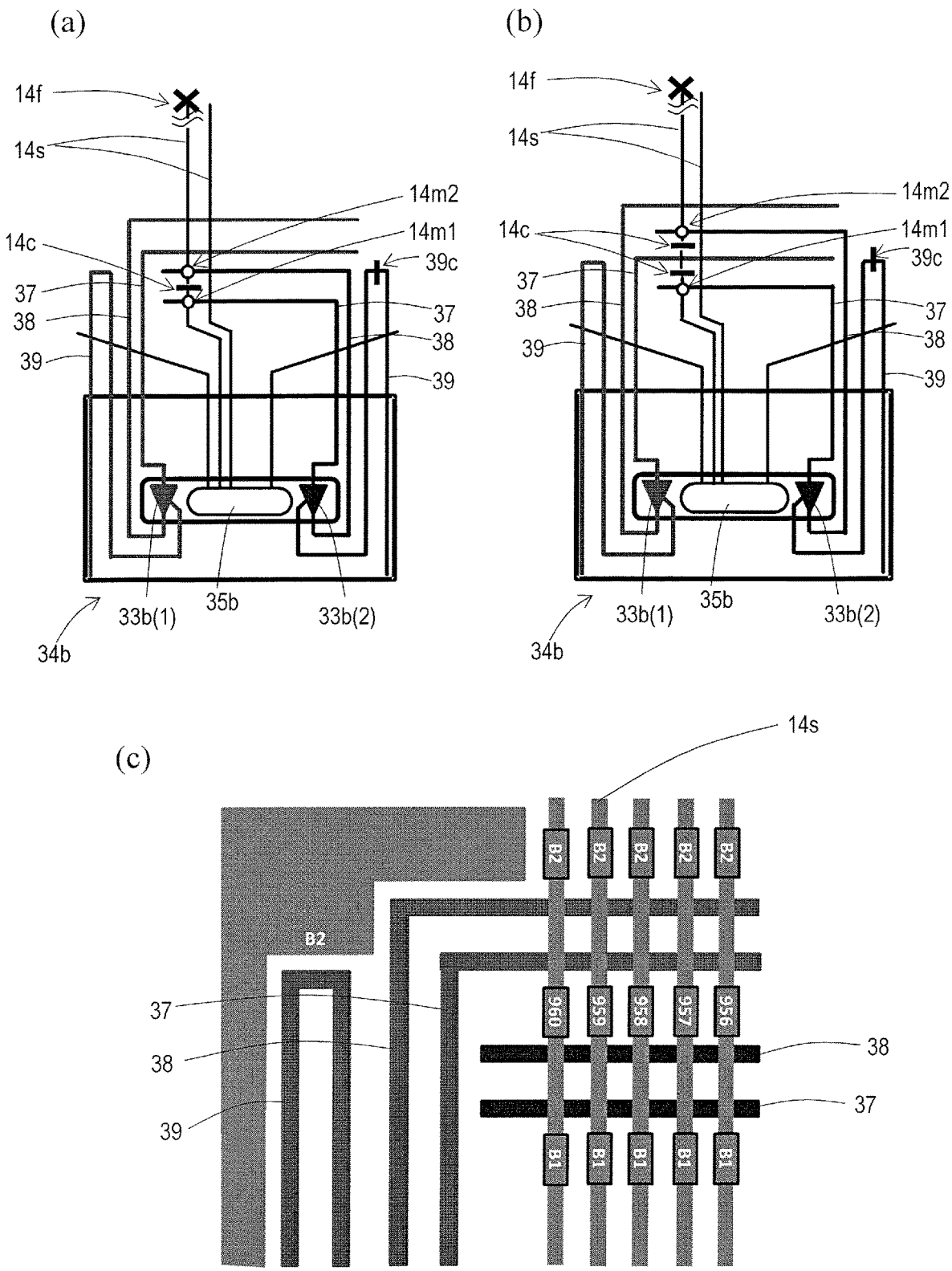
FIGS. 14 (a) and (b) each show an exemplary schematic plan view of a second buffer circuit 34b, and (c) shows a portion of (a) on an enlarged scale.

Referring to FIGS. 14(a) to 14(c), the arrangement of the input line 37 and the output line 38 of the buffer circuits 34a and 34b will be described. FIGS. 14(a) and 14(b) each show an exemplary schematic plan view of the second buffer circuit 34b, and FIG. 14(c) shows a portion of FIG. 14(a) on an enlarged scale. Note that while an example of the second buffer circuit 34b is shown in FIG. 14, the first buffer circuit 34a typically has a similar structure to that of the second buffer circuit 34b, and will therefore not be described below.

As shown in FIGS. 14(a) and 14(b), the second buffer circuit 34b includes two second buffers 33b(1) and 33b(2), for example. For example, a plurality of second buffer circuits 34b and a plurality of second source drivers 35b as shown in the figure are provided in the second frame region 20b. In the illustrated example, a maximum of two source bus lines 14s that have been broken, of all the source bus lines 14s connected to the second source driver 35b, can be repaired.

As shown in FIG. 14(c), the source bus lines 14s are preferably assigned identification symbols (e.g., numbers, characters, symbols, etc.) for facilitating the identification of a source bus line 14s to be repaired and a buffer 33b to be connected to the source bus line 14s. This can improve the repair efficiency. For example, in FIG. 14(c), "956" to "960" are numbers used for numbering the source bus lines 14s. In FIG. 14(c), "B1" and "B2" are symbols used for numbering the second buffer 33b(1) and the second buffer 33b(2).

The input line 37 and the output line 38 connected to each of the second buffers 33b(1) and 33b(2) are preferably arranged adjacent to each other as shown in FIG. 14(a), as opposed to the arrangement shown in FIG. 14(b). In the example of FIG. 14(a), one cut-off point 14c and two connection points 14m1 and 14m2 are formed in order to connect the source bus line 14s where the break 14f has occurred to the second buffer 33b(2). Then, since the identification symbol for identifying the source bus line 14s where the break 14f has occurred, the identification symbol for identifying the second buffer 33b(2) to be connected to this source bus line 14s, the cut-off point 14c and the connection points 14m1 and 14m2 are all in the vicinity of each other, as shown in FIGS. 14(a) and 14(c), the efficiency of the repair work is improved. Improving the efficiency of the repair work also leads to a decrease in the risk of erroneous cut-offs, erroneous connections, etc. In view of improving the repair work efficiency, it is preferred that the identification symbol, the cut-off point and the connection point are within the same field of view of the microscope for checking repair position, for example. Even when the identification symbol, the cut-off point and the connection point are not within the same field of view, if they are in the vicinity of each other, the efficiency of the repair work is improved because it results in a short distance over which the field of view needs to be moved for checking them, and a short distance over which the laser needs to be moved for forming the cut-off point and the connection point.

In contrast, as shown in FIG. 14(b), if the arrangement is such that the input line 37 connected to the second buffer 33b(1) is adjacent to the input line 37 connected to the second buffer 33b(2) while the output line 38 connected to the second buffer 33b(1) is adjacent to the output line 38 connected to the second buffer 33b(2), the identification symbol for identifying the source bus line 14s where the break 14f has occurred and the identification symbol for identifying the second buffer 33b(2) to be connected to the source bus line 14s, the cut-off point 14c and the connection points 14m1 and 14m2 are arranged spaced apart from each other. Regarding the cut-off point 14c, either one of the two cut-off points 14c shown in FIG. 14(b) may be formed. With the arrangement shown in FIG. 14(b), the identification symbols, the cut-off point and the connection point may not be included within the same field of view of the microscope for checking repair position. Moreover, since this results in a long distance over which the field of view needs to be moved for checking the identification symbols, the cut-off point and the connection point, and a long distance over which the laser needs to be moved for forming the cut-off point and the connection point, the efficiency of the repair work may decrease, and the risk of erroneous cut-offs, erroneous connections, etc., may increase.

Figure 15:
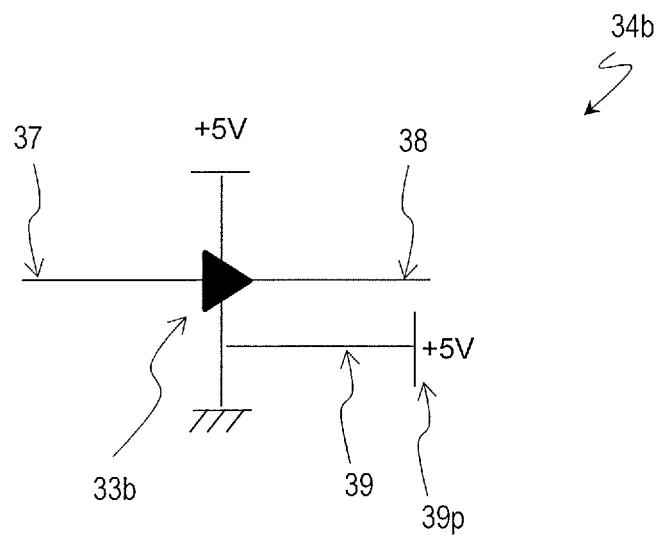
FIGS. 15 (a) and (b) are each an exemplary circuit diagram of the second buffer circuit 34b.
Figure 15:
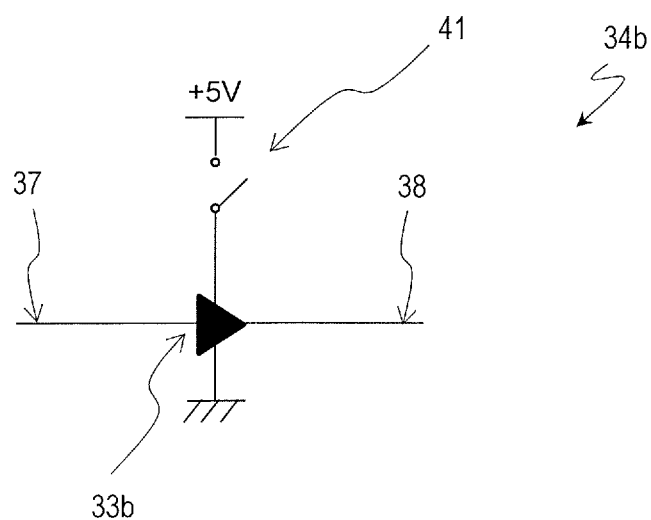

As shown in FIG. 13 and FIG. 14, the second buffer circuit 34b further includes an additional line 39 connected to a power supply 39p, for example. FIG. 15(a) also shows an exemplary circuit diagram of the second buffer circuit 34b. FIG. 15(b) shows another exemplary circuit diagram of the second buffer circuit 34b.

As shown in FIGS. 13 to 14 and FIG. 15(a), the second buffer 33b connected to the additional line 39 is in an inoperative state. By cutting off the additional line 39 at a cut-off point 39c and making the second buffer 33b electrically independent of the power supply 39p, the second buffer 33b is brought into an operative state. That is, the additional line 39 functions as a switching mechanism for controlling the switching of the second buffer 33b from an inoperative state to an operative state. If each second buffer 33b has the switching mechanism, only those buffers that are connected to source bus lines can be selectively brought into an operative state, while the other buffers are left in an inoperative state. For example, the first and second buffers 33a and 33b included in the first and second buffer circuits 34a and 34b provided corresponding to those source bus lines 14s with no break 14f, from among the plurality of source bus lines 14s, are in an inoperative state.

Although the switching mechanism of the second buffer circuit has been described above, the first buffer circuit includes a similar switching mechanism. The switching mechanism of the first buffer circuit may be referred to as the first switching mechanism, and the switching mechanism of the second buffer circuit may be referred to as the second switching mechanism.

When buffer circuits include switching mechanisms, it is possible to prevent erroneous actuation of those buffers that are not used. Particularly, it is believed that if the input line 37 and the output line 38 connected to each of the second buffers 33b(1) and 33b(2) are arranged adjacent to each other as shown in FIG. 14(a), erroneous actuation (e.g., oscillation of the buffer circuit 34b) is more likely to occur. This is because a parasitic capacitance is formed between the input/output lines 37 and 38, thereby making it possible that the input line 37 and the output line 38 are coupled together via the parasitic capacitance. When the buffer 33b is actuated erroneously, noise and heat may be generated. Therefore, when input/output lines connected to each buffer are arranged adjacent to each other, it is particularly preferred that each buffer circuit includes a switching mechanism.

With a liquid crystal display panel having a one-side input driving structure, there is no motivation to arrange the input/output lines of the buffer circuit to be adjacent to each other. This is because with a liquid crystal display panel having a one-side input driving structure, arranging the input/output lines of the buffer circuit to be adjacent to each other does not lead to an improvement of the repair efficiency, as will be described below. Therefore, it is often the case with a liquid crystal display panel having a one-side input driving structure that there is no such problem that the buffer may be actuated erroneously.

With a liquid crystal display panel having a one-side input driving structure, the source drivers are provided only in a region that is on one side (e.g., on the upper side) of the display region. When a break occurs in a source bus line, a display signal voltage from a source driver is supplied directly to one end of the source bus line while the display signal voltage from the source driver is supplied to the other end of the source bus line via a spare wire provided outside the display region. On the path where it is supplied via a spare wire, the output from the source driver is output to the source bus line via a buffer circuit in order to compensate for the voltage drop due to the spare wire. The input/output lines of the buffer circuit are connected to the source bus line on opposite sides of the display region. That is, the two connection points that are formed for the connection between the source bus line and the buffer are provided spaced apart from each other on opposite sides of the display region, e.g., one in the upper region and the other in the lower region. Since the two connection points are arranged spaced apart from each other, arranging the input/output lines of the buffer circuit adjacent to each other does not lead to an improvement of the repair work efficiency described above.

The switching mechanism is not limited to the example described above. For example, as shown in FIG. 15(b), the buffer circuit may include a switch 41 as a switching mechanism. The switch 41 may be a mechanism capable of physically switching between ON and OFF, or may be a mechanism capable of switching between ON and OFF by receiving a signal for controlling ON/OFF from a control board.

Embodiment 5

An active matrix substrate (TFT substrate) used in a liquid crystal display panel according to Embodiment 5 of the present invention will now be described with reference to the drawings. The active matrix substrate of the present embodiment is an active matrix substrate including an oxide semiconductor TFT and a crystalline silicon TFT that are formed on the same substrate.

The active matrix substrate includes a TFT (pixel TFT) for each pixel. The pixel TFT may be an oxide semiconductor TFT using an In—Ga—Zn—O-based semiconductor film as its active layer, for example.

A part or whole of the peripheral driving circuit may be formed on the same substrate as the pixel TFT. Such an active matrix substrate is called a driver-monolithic active matrix substrate. With a driver-monolithic active matrix substrate, the peripheral driving circuit is provided in a region (non-display region or frame region) other than a region (display region) including a plurality of pixels. For example, a crystalline silicon TFT using a polycrystalline silicon film as its active layer is used as the TFT (circuit TFT) of the peripheral driving circuit. By using an oxide semiconductor TFT as the pixel TFT and a crystalline silicon TFT as the circuit TFT as described above, it is possible to lower the power consumption in the display region and to reduce the size of the frame region.

Next, a more specific configuration of the active matrix substrate of the present embodiment will be described with reference to the drawings.

Figure 17:
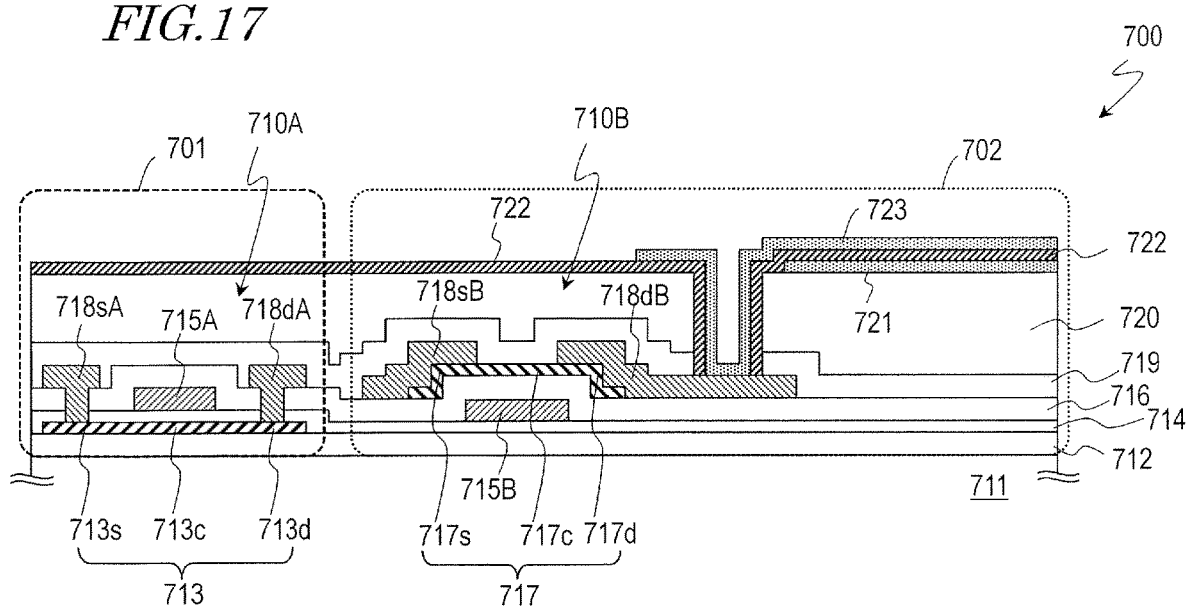
FIG. 17 A cross-sectional view of a crystalline silicon TFT 710A and an oxide semiconductor TFT 710B of an active matrix substrate 700 used in a liquid crystal display panel according to Embodiment 5 of the present invention.

FIG. 17 is a cross-sectional view showing a cross-sectional structure of a crystalline silicon TFT (hereinafter referred to as a "first thin film transistor".) 710A and an oxide semiconductor TFT (hereinafter referred to as a "second thin film transistor".) 710B of an active matrix substrate (TFT substrate) 700 of the present embodiment.

The active matrix substrate 700 includes a display region 702 including a plurality of pixels and a region (non-display region) other than the display region 702. The non-display region includes a driving circuit formation region 701 where driving circuits are provided. A part or whole of the gate driver circuit of the gate driver 32 shown in FIG. 1 is provided in the driving circuit formation region 701. A part or whole of source driver circuits of the first source driver 35a and the second source driver 35b shown in FIG. 1 may be further provided in the driving circuit formation region 701.

As shown in FIG. 17, on the active matrix substrate 700, the second thin film transistor 710B is formed as a pixel TFT in each pixel of the display region 702, and the first thin film transistor 710A is formed as a circuit TFT in the driving circuit formation region 701.

The present embodiment can be applied to any of the liquid crystal display panels of the preceding embodiments. For example, the second thin film transistor 710B of the present embodiment can be used as the transistors 18a and 18b described above with reference to FIG. 2 to FIG. 5, FIG. 7 to FIG. 9, FIG. 11 and FIG. 12.

The active matrix substrate 700 includes a substrate 711, a base film 712 formed on the surface of the substrate 711, the first thin film transistor 710A formed on the base film 712, and the second thin film transistor 710B formed on the base film 712. The first thin film transistor 710A is a crystalline silicon TFT that has an active region that primarily contains a crystalline silicon. The second thin film transistor 710B is an oxide semiconductor TFT that has an active region that primarily contains an oxide semiconductor. The first thin film transistor 710A and the second thin film transistor 710B are built integral with the substrate 711. The "active region" as used herein refers to a region of the semiconductor layer to be the active layer of the TFT where the channel is formed.

The first thin film transistor 710A includes a crystalline silicon semiconductor layer (e.g., a low-temperature polysilicon layer) 713 formed on the base film 712, a first insulating layer 714 covering a crystalline silicon semiconductor layer 713, and a gate electrode 715A provided on the first insulating layer 714. A portion of the first insulating layer 714 that is located between the crystalline silicon semiconductor layer 713 and the gate electrode 715A functions as a gate insulating film of the first thin film transistor 710A. The crystalline silicon semiconductor layer 713 includes a region (active region) 713c where the channel is formed, and a source region 713s and a drain region 713d located on opposite sides of the active region. In this example, a portion of the crystalline silicon semiconductor layer 713 that overlaps the gate electrode 715A with the first insulating layer 714 therebetween is the active region 713c. The first thin film transistor 710A also includes a source electrode 718sA and a drain electrode 718dA connected to the source region 713s and the drain region 713d, respectively. The source and drain electrodes 718sA and 718dA may be provided on an interlayer insulating film (herein, a second insulating layer 716) that covers the gate electrode 715A and the crystalline silicon semiconductor layer 713, and may be connected to the crystalline silicon semiconductor layer 713 in contact holes running through the interlayer insulating film.

The second thin film transistor 710B includes a gate electrode 715B provided on the base film 712, the second insulating layer 716 covering the gate electrode 715B, and an oxide semiconductor layer 717 arranged on the second insulating layer 716. As shown in the figure, the first insulating layer 714, which is the gate insulating film of the first thin film transistor 710A, may be extended to a region where the second thin film transistor 710B is to be formed. In such a case, the oxide semiconductor layer 717 may be formed over the first insulating layer 714. A portion of the second insulating layer 716 that is located between the gate electrode 715B and the oxide semiconductor layer 717 functions as a gate insulating film of the second thin film transistor 710B. The oxide semiconductor layer 717 includes a region (active region) 717c where the channel is formed, and a source contact region 717s and a drain contact region 717d located on opposite sides of the active region. In this example, a portion of the oxide semiconductor layer 717 that overlaps the gate electrode 715B with the second insulating layer 716 therebetween is the active region 717c. The second thin film transistor 710B further includes a source electrode 718sB and a drain electrode 718dB connected to the source contact region 717s and the drain contact region 717d, respectively. Note that no base film 712 may be provided on the substrate 711.

The thin film transistors 710A and 710B are covered by a passivation film 719 and a flattening film 720. In the second thin film transistor 710B that functions as a pixel TFT, the gate electrode 715B is connected to a gate bus line (not shown), the source electrode 718sB to a source bus line (not shown), and the drain electrode 718dB to a pixel electrode 723. In this example, the drain electrode 718dB is connected to the corresponding pixel electrode 723 in an opening running through the passivation film 719 and the flattening film 720. A video signal is supplied to the source electrode 718sB via the source bus line, and a required electric charge is written to the pixel electrode 723 based on the gate signal from the gate bus line.

Note that as shown in the figure, a transparent conductive layer 721 may be formed as a common electrode on the flattening film 720, and a third insulating layer 722 may be formed between the transparent conductive layer (common electrode) 721 and the pixel electrode 723. In such a case, a slit-shaped opening may be provided in the pixel electrode 723. Such an active matrix substrate 700 can be applied to a display device of the FFS (Fringe Field Switching) mode, for example.

In the illustrated example, the first thin film transistor 710A has a top-gate structure in which the crystalline silicon semiconductor layer 713 is arranged between the gate electrode 715A and the substrate 711 (the base film 712). On the other hand, the second thin film transistor 710B has a bottom-gate structure in which the gate electrode 715B is arranged between the oxide semiconductor layer 717 and the substrate 711 (the base film 712). By employing such a structure, it is possible to more effectively suppress an increase in the number of manufacturing steps and the manufacturing cost, when two types of thin film transistors 710A and 710B are integrally formed on the same substrate 711.

The TFT structures of the first thin film transistor 710A and the second thin film transistor 710B are not limited to those described above.

INDUSTRIAL APPLICABILITY

The present invention can be widely used as a liquid crystal display panel and a repair method therefor, and particularly as a large-size liquid crystal display panel for use in a high-definition television and a method for repairing a break in a source bus line thereof.

REFERENCE SIGNS LIST

10A1 to 10A3, 10B1 to 10B3, 10C1 to 10C3, 10X TFT substrate
10d Display region
12 Gate bus line
14a, 14b, 14s Source bus line (first or second source bus line)
14c Cut-off point
14f Break
14m1, 14m2 Connection point
20a, 20b First or second frame region
32 Gate driver
33a, 33b First or second buffer
34a, 34b First or second buffer circuit
35a, 35b First or second source driver
37 Input line
38 Output line
39 Additional line
39c Cut-off point
100, 200 Liquid crystal display panel

The invention claimed is:

1. A liquid crystal display panel comprising:
a plurality of pixels arranged in a matrix pattern having a plurality of rows and a plurality of columns;
a plurality of transistors each of which is connected to one of the plurality of pixels;
a plurality of gate bus lines each of which extends in a row direction and is connected to one or more of the plurality of transistors;
a plurality of source bus lines each of which extends in a column direction and is connected to one or more of the plurality of transistors;
a plurality of first source drivers provided in a first frame region on an upper side of a display region that is defined by the plurality of pixels, each first source driver supplying a first display signal voltage to source bus lines, from among the plurality of source bus lines, that are associated with the first source driver; and
a plurality of second source drivers provided in a second frame region on a lower side of the display region, each second source driver supplying a second display signal voltage to source bus lines, from among the plurality of source bus lines, that are associated with the second source driver,
wherein in each vertical scanning period, the first display signal voltage and the second display signal voltage are supplied to each of the plurality of source bus lines while being superposed on each other, and polarities of the first display signal voltage and the second display signal voltage do not change within each vertical scanning period.

2. The liquid crystal display panel of claim 1, wherein the plurality of source bus lines include first source bus lines arranged corresponding to pixel columns, and transistors connected to two pixels adjacent to each other in the row direction are connected to different first source bus lines, and wherein polarities of the first display signal voltages supplied to two first source bus lines adjacent to each other are opposite to each other in each vertical scanning period, and polarities of the second display signal voltages supplied to two first source bus lines adjacent to each other are opposite to each other in each vertical scanning period.

3. The liquid crystal display panel of claim 2, wherein transistors connected to two pixels adjacent to each other in the column direction are connected to different first source bus lines.

4. The liquid crystal display panel of claim 2, wherein where m is the number of the plurality of rows of the plurality of pixels, in each pixel column, transistors connected to N pixels (N is an integer greater than or equal to two and less than or equal to twice a quotient obtained by dividing m by 1080) adjacent to each other are connected to the first source bus line arranged corresponding to that pixel column, and transistors connected to N pixels adjacent to each other that are adjacent in the column direction to the above-mentioned N pixels are connected to the first source bus line arranged corresponding to a pixel column adjacent to that pixel column.

5. The liquid crystal display panel of claim 1, wherein the plurality of source bus lines include first source bus lines and second source bus lines arranged corresponding to pixel columns so that polarities of the first display signal voltages supplied thereto are opposite to each other in each vertical scanning period and polarities of the second display signal voltages supplied thereto are opposite to each other in each vertical scanning period.

6. The liquid crystal display panel of claim 5, wherein polarities of the first display signal voltage supplied to two pixels adjacent to each other in the row direction are opposite to each other in each vertical scanning period, and polarities of the second display signal voltage supplied to two pixels adjacent to each other in the row direction are opposite to each other in each vertical scanning period.

7. The liquid crystal display panel of claim 6, wherein in each pixel row, one of two pixels adjacent to each other in the row direction is connected to the first source bus line with the other pixel connected to the second source bus line.

8. The liquid crystal display panel of claim 6, wherein in each pixel row, both of two pixels adjacent to each other in the row direction are connected to the first source bus line or the second source bus line.

9. The liquid crystal display panel of claim 5, wherein in each pixel column, a transistor connected to a predetermined pixel is connected to the first source bus line arranged corresponding to that pixel column, and a transistor connected to a pixel that is adjacent in the column direction to the predetermined pixel is connected to the second source bus line arranged corresponding to that pixel column.

10. The liquid crystal display panel of claim 5, wherein where m is the number of the plurality of rows of the plurality of pixels, in each pixel column, transistors connected to N pixels (N is an integer greater than or equal to two and less than or equal to twice a quotient obtained by dividing m by 1080) adjacent to each other are connected to the first source bus line arranged corresponding to that pixel column, and transistors connected to N pixels adjacent to each other that are adjacent in the column direction to the above-mentioned N pixels are connected to the second source bus line arranged corresponding to that pixel column.

11. The liquid crystal display panel of claim 1, wherein the number of the plurality of rows of the plurality of pixels is greater than 1080.

12. The liquid crystal display panel of claim 1, further comprising:
a plurality of first buffer circuits provided in the first frame region, each first buffer circuit corresponding to one of the plurality of first source drivers and the source bus lines that are associated with the one of the plurality of first source drivers, and each first buffer circuit including a plurality of first buffers; and
a plurality of second buffer circuits provided in the second frame region, each second buffer circuit corresponding to one of the plurality of second source drivers and the source bus lines that are associated with the one of the plurality of second source drivers, and each second buffer circuit including a plurality of second buffers.

13. The liquid crystal display panel of claim 12, wherein an input line and an output line connected to each of the plurality of first buffers are arranged adjacent to each other, and an input line and an output line connected to each of the plurality of second buffers are arranged adjacent to each other.

14. The liquid crystal display panel of claim 12, wherein each of the plurality of first buffers includes a first switching mechanism for controlling switching of the first buffer from an inoperative state to an operative state, and each of the plurality of second buffers includes a second switching mechanism for controlling switching of the second buffer from an inoperative state to an operative state.

15. The liquid crystal display panel of claim 12, wherein the plurality of first and second buffers included in the first and second buffer circuits corresponding to source bus lines, from among the plurality of source bus lines, that have not been broken, are in an inoperative state.

16. A method for repairing the liquid crystal display panel of claim 12, comprising the steps of:
when a break occurs in one of the plurality of source bus lines, and a distance from a location of the break to the first source driver is greater than a distance from the location of the break to the second source driver, connecting the source bus line in which the break has occurred to one of the plurality of first buffers; and
when a break occurs in one of the plurality of source bus lines, and a distance from a location of the break to the second source driver is greater than a distance from the location of the break to the first source driver, connecting the source bus line in which the break has occurred to one of the plurality of second buffers.

17. The repair method of claim 16, wherein
each of the plurality of first buffers includes a first switching mechanism for controlling switching of the first buffer from an inoperative state to an operative state, and each of the plurality of second buffers includes a second switching mechanism for controlling switching of the second buffer from an inoperative state to an operative state; and
the repair method further comprises:
a step of switching the first buffer that is to be connected to the source bus line in which the break has occurred from an inoperative state to an operative state by operating the first switching mechanism of the first buffer; or
a step of switching the second buffer that is to be connected to the source bus line in which the break has occurred from an inoperative state to an operative state by operating the second switching mechanism of the second buffer.

\* \* \* \* \*